United States Patent
Chhibber et al.

(10) Patent No.: US 8,705,815 B2
(45) Date of Patent: *Apr. 22, 2014

(54) SYSTEMS AND METHODS FOR AUTOMATIC SKIN-BASED IDENTIFICATION OF PEOPLE USING DIGITAL IMAGES

(75) Inventors: Rajeshwar Chhibber, San Jose, CA (US); Ashutosh Chhibber, San Jose, CA (US); Shefali Sharma, Petaluma, CA (US)

(73) Assignee: Brightex Bio-Photonics LLC, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/385,744

(22) Filed: Mar. 5, 2012

(65) Prior Publication Data

US 2012/0281079 A1 Nov. 8, 2012

Related U.S. Application Data

(63) Continuation of application No. 11/476,469, filed on Jun. 27, 2006, now Pat. No. 8,131,029, which is a continuation-in-part of application No. 11/232,454, filed on Sep. 20, 2005, now Pat. No. 7,840,064.

(51) Int. Cl.
*G06K 9/00* (2006.01)

(52) U.S. Cl.
USPC .......................................... 382/118; 382/224

(58) Field of Classification Search
USPC ......... 382/100, 128, 115, 116, 118, 165, 181, 382/190, 224, 226; 600/306, 473, 476; 607/94

See application file for complete search history.

(56) References Cited

U.S. PATENT DOCUMENTS

| | | | | |
|---|---|---|---|---|
| 4,151,512 A | * | 4/1979 | Riganati et al. | 382/125 |
| 4,186,378 A | * | 1/1980 | Moulton | 382/115 |
| 4,236,082 A | * | 11/1980 | Butler | 250/461.1 |
| 4,894,547 A | * | 1/1990 | Leffell et al. | 250/461.2 |
| 5,363,854 A | * | 11/1994 | Martens et al. | 600/477 |
| 5,862,247 A | * | 1/1999 | Fisun et al. | 382/116 |
| 6,061,463 A | * | 5/2000 | Metz et al. | 382/124 |
| 7,840,064 B2 | * | 11/2010 | Chhibber et al. | 382/165 |
| 8,131,029 B2 | * | 3/2012 | Chhibber et al. | 382/128 |
| 2004/0179719 A1 | * | 9/2004 | Chen et al. | 382/118 |

OTHER PUBLICATIONS

Kollias et al., Optical non-invasive approaches to diagnosis of skin diseases, JID Symposium Proceedings 7:64-75, Dec. 2002.*
Hsu et al., Face detection in color images, IEEE Transactions on Pattern Analysis and Machine Intelligence, vol. 24, No. 5, May 2002.*

* cited by examiner

*Primary Examiner* — Tahmina Ansari
(74) *Attorney, Agent, or Firm* — Morgan, Lewis & Bockius LLP; Richard F. Trecartin

(57) ABSTRACT

Systems and methods are provided for automatic identification of a person based on an analysis of the person's skin. In one embodiment, a method for automatically identifying a person comprises acquiring white-light and UV images of a portion of the person's skin, generating a skin mask from the white-light image, and comparing the skin mask with a pre-stored skin mask of the person. If a substantial match is not found between the two skin masks, the person is not identified, and an error message such as "wrong person" or "person unknown" is returned. Otherwise, the method proceeds to obtain results associated with certain skin conditions using at least the UV image. The results are compared with pre-stored results to determine if the person is the right person or the wrong person.

44 Claims, 21 Drawing Sheets

| Color Space | Range for each color channel likely associated with skin pixel | | |
| --- | --- | --- | --- |
| | Channel 1 | Channel 2 | Channel 3 |
| RGB | 105 – 255 | 52 – 191 | 32 – 180 |
| YIQ | 66 – 206 | 20 – 77 | 0 – 32 |
| LAB | 132 – 165 | 133 – 150 | 170 – 230 |
| YcBcR | 149 – 200 | 85 – 123 | 80 – 190 |
| HSV | 140 – 255 | 62 – 162 | 0 – 41 |

| Skin Condition | Color | Values |
|---|---|---|
| Inflamed Pores | White | Intensity greater than 130 |
| Bacteriostatic pores | Yellow | Intensity greater than 130 |
| Sluggish Oil Flow | Red | Intensity greater than 130 |
| Deeply Inflamed Pores | Bright white | Intensity greater than 130 |

SYSTEMS AND METHODS FOR AUTOMATIC SKIN-BASED IDENTIFICATION OF PEOPLE USING DIGITAL IMAGES

CROSS REFERENCE TO RELATED APPLICATIONS

The present application is a continuation of U.S. patent application Ser. No. 11/476,469 filed on Jun. 27, 2006, now U.S. Pat. No. 8,131,029 which is a continuation-in-part of U.S. patent application Ser. No. 11/232,454 filed on Sep. 20, 2005, now U.S. Pat. No. 7,840,064 the entire disclosures of which are is incorporated herein by reference.

FIELD OF THE INVENTION

The present invention relates generally to digital image acquisition, processing and analysis, and more particularly to automatic identification of people using digital images.

BACKGROUND INFORMATION

A number of devices for facial recognition are present in the market today, such as the facial recognition systems made by Identix Inc., of Minnetonka, Minn., and Neven Vision, of Santa Monica, Calif. Most of these systems make use of one or both of two main facial feature detection algorithms, eigenface and local feature analysis, and generally work by first recognizing a face in general and then performing feature measurements to find corresponding matches in a data base. To recognize a face in general, multi-scale algorithms are used to search a field of view at a low resolution in order to detect a general facial shape. Once the facial shape is detected, alignment begins in which the head position, size, and pose are determined. An image is then normalized and facial data is translated into a unique code, which allows for easier comparison to stored data.

One limitation of the above systems is that the face must be angled at a certain angle toward the camera, for example, 35 degrees and above, for the image to be taken. Furthermore, since most of these systems only examine geometrical shapes, sizes, and locations of facial features, they cannot easily tell the difference between a real person's face and a rubber mode or photograph of the person's face, and can thus be easily fooled by someone attempting to bypass a security system utilizing one of the facial recognition systems.

Another limitation is that these systems are not scalable and can only be used in a limited number of devices. Cameras are now available in various information appliances, such as cellular phones, personal digital assistants ("PDAs"), notebook computers, digital music players, among others. To date, there is no facial recognition system that can be used in a multitude of portable devices for basic identification purposes or to improve security at a given location.

There is therefore a need for a more precise facial recognition method and system that are not susceptible to the above types of fraud.

There is also a need for a facial recognition method and system that can be used in portable devices.

SUMMARY OF THE INVENTION

In view of the foregoing, the present invention provides systems and methods for automatic identification ("auto-identification") of a person using digital images based on an analysis of the person's skin.

White-light and/or ultraviolet ("UV") images of a portion of a person's skin are acquired to generate a skin mask. The skin mask is then compared with a pre-stored skin mask of the person. If a substantial match is not found between the two skin masks, the person is not identified, and an error message such as "wrong person" or "person unknown" is returned. Otherwise, one or both of the UV and white-light images are used to obtain results associated with certain skin conditions with the person. The results are compared with pre-stored results to determine if the person is the right person, i.e., identified, or the wrong person, i.e., not identified. In a preferred embodiment, both white-light and UV images are used to identify the person.

The skin conditions may include, but are not limited to, skin tone, UV damage, pores, wrinkles, hydration levels, collagen content, skin type, topical inflammation or recent ablation, keratosis, deeper inflammation, sun spots, different kinds of pigmentation including freckles, moles, growths, scars, acne, fungi, erythema and other artifacts. Information in the skin pixels may also be used to perform feature measurements such as the size and volume of a lip, nose, eyes, ears, chins, cheeks, forehead, eyebrows, among other features.

In one exemplary embodiment, the skin mask may be a virtual image or matrix or data group having a plurality of elements, each corresponding to a pixel in the white-light or UV image. The white-light image may be an image of a first color space, referred to herein as the "original white-light image." At least one other white-light image may be constructed by converting the original white-light image into at least one second color space.

For each element in the skin mask, pixel properties of the corresponding pixel in each of the white light images is examined. A first value, such as 255, is assigned to an element in the skin mask if pixel properties of the corresponding pixel in each of the white-light images satisfy predetermined criteria for skin pixels associated with a respective color space. A second value, such as 0, is assigned to an element in the skin mask if pixel properties in the corresponding pixel in any of the white-light images do not satisfy predetermined criteria for skin pixels associated with a respective color space. Furthermore, some of the elements in the skin mask are predefined non-skin features according to a coordinate reference. These elements are assigned the second value disregarding what values their corresponding pixels in the white-light images may have.

After the elements of the skin mask have been assigned the first or second value, each pixel in any of the white-light and UV images that corresponds to an element having the first value in the skin mask would be identified as a skin pixel, and each pixel in any of the white-light and UV images that corresponds to an element having the second value in the skin mask would be identified as a non-skin pixel. Pixels that are identified as non-skin pixels are not considered in obtaining results for the at least one skin conditions. Each skin pixel of the white-light and UV images includes values associated with three color channels. In an exemplary embodiment, results for an UV damage condition are computed based on values associated with one of the three color channels in the skin pixels of the first UV image.

In another exemplary embodiment, a standard deviation is computed for each of the three color channels based on values associated with a respective one of the three color channels in the skin pixels of the white-light image, and the standard deviations for the three color channels, or their average value, is used as a quantitative measure of the skin tone of the person being identified.

In a further exemplary embodiment, a color value and an intensity value associated with each of the skin pixels in the first UV image are computed and examined against a look-up table to see if they correspond to a specified skin condition. For each skin pixel in the UV image that has color and intensity values falling within predetermined ranges for a specified skin condition, surrounding skin pixels are examined for the specified skin condition to determine a size of a skin area adjacent the skin pixel and having the specified skin condition.

For example, the specified skin condition may include a plurality of types of pores, and for each skin pixel in the UV image that has color and intensity values falling within predetermined ranges for each of the plurality of types of pores, a size of a pore is determined by examining surrounding skin pixels to determine if they belong to a same pore, and the pores are counted to obtain a pore count for each type and or all types of pores.

According to these and other embodiments of the present invention, the systems for auto-identification using digital images generally include an image acquisition device, at least one light source coupled to the image acquisition device, a computing device coupled to the image acquisition device and to the light source, and a display coupled to the computing device. The computing device includes modules for carrying out different aspects of the invention as summarized above and described in more detail herein below. The modules may be in hardware or software or combinations of hardware and software. In one exemplary embodiment, the computing device includes a microprocessor and a memory device coupled to the microprocessor, and the modules include software programs stored as program instructions in a computer readable medium associated with the memory device.

The image acquisition device may include, but is not limited to, film-based or digital cameras, wireless phones and other personal digital appliances ("PDAs") equipped with a camera, desktop and notebook computers equipped with cameras such as webcams and other types of cameras, and digital music players, set-top boxes, video game and entertainment units, and any other portable device capable of acquiring digital images and having or interacting with at least one light source.

In one exemplary embodiment, the image acquisition device coupled with at least one light source may be connected to the computing device via a wired or wireless network. Accordingly, images acquired by the image acquisition device coupled with at least one light source may be sent to the computing device via a network for analysis. The results of the analysis may then be sent to a user of the image acquisition device via a number of communication means, including, but not limited to, email, fax, voice mail, and surface mail, among others. Alternatively, the results may be posted on a web site or another medium for later retrieval by the user.

In another exemplary embodiment, the image acquisition device coupled with at least one light source may include a portion or all of the modules for carrying out different aspects of the invention as summarized above and described in more detail herein below. In this exemplary embodiment, the images acquired by the image acquisition device may be analyzed on the device itself, thereby eliminating the need for the images to be sent to a separate computing device connected to the image acquisition device. Alternatively, a partial analysis may be performed in the image acquisition device and the images may still be sent to a separate computing device for further analysis.

The image acquisition device and the systems of the present invention may be used at a number of locations, including security checkpoints at airports or inside cars, airplanes or at any other location suitable for identifying a person. In one exemplary embodiment, the image acquisition device and the systems of the present invention may be used to match an image of a person on a identification card with an image of the person acquired immediately on site.

Advantageously, since the skin pixels in the UV image often include information in the subsurface of the skin and are indicative of the types of organisms under the skin, the auto-identification systems and methods of the present invention are safeguarded against fraud attempts using a picture or mold because a picture or mold, being made of different materials, would not fluoresce the same way as a person's skin under UV illumination.

BRIEF DESCRIPTION OF THE DRAWINGS

The foregoing and other objects of the present invention will be apparent upon consideration of the following detailed description, taken in conjunction with the accompanying drawings, in which like reference characters refer to like parts throughout, and in which:

FIG. 8B is a table listing ranges of pixels values for different color channels for each of a plurality of color spaces that are used to identify skin pixels;

FIG. 13B is a table listing pixel color and intensity associated with different skin conditions;

DETAILED DESCRIPTION OF EMBODIMENTS OF THE INVENTION

Generally, in accordance with exemplary embodiments of the present invention, systems and methods are provided for automatic identification ("auto-identification") of a person based on an analysis of the person's skin.

Figure 1:
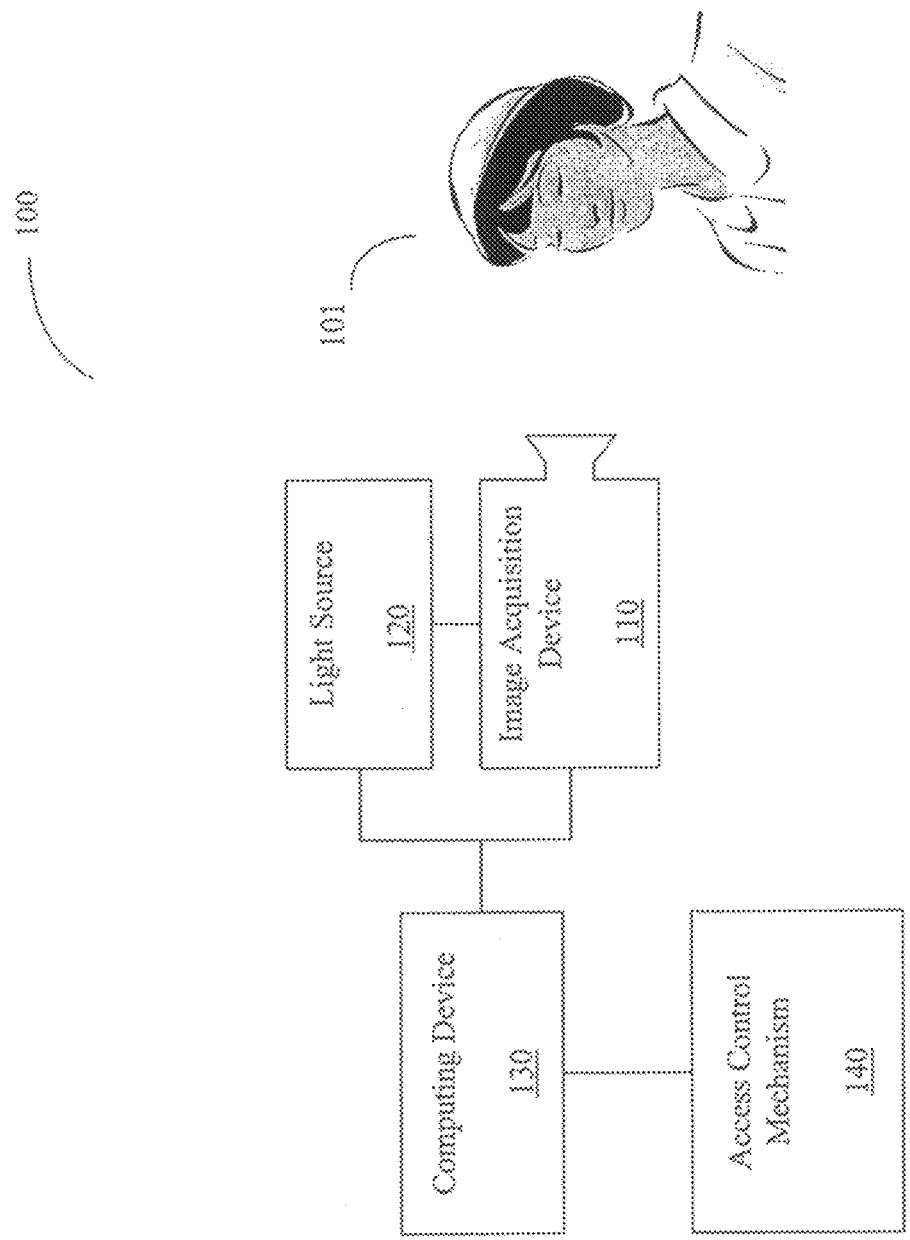
FIG. 1 is a simplified block diagram of a system for auto-identification according to embodiments of the present invention.

A simplified block diagram of a system for auto-identification of a person in accordance with the present invention is shown in FIG. 1. System 100 includes image acquisition device 110, at least one light source 120 coupled to image acquisition device 110, computing device 130 coupled to image acquisition device 110 and to at least one light source either directly or through image acquisition device 110, display 140 coupled to computing device 130, and optionally printer 150 (not shown) also coupled to computing device 130. System 100 is configured to acquire digital images of a person, e.g., subject 101, for analysis, such as a person's face, and to process the digital images to automatically identify the person based on the person's skin.

Figure 2A:
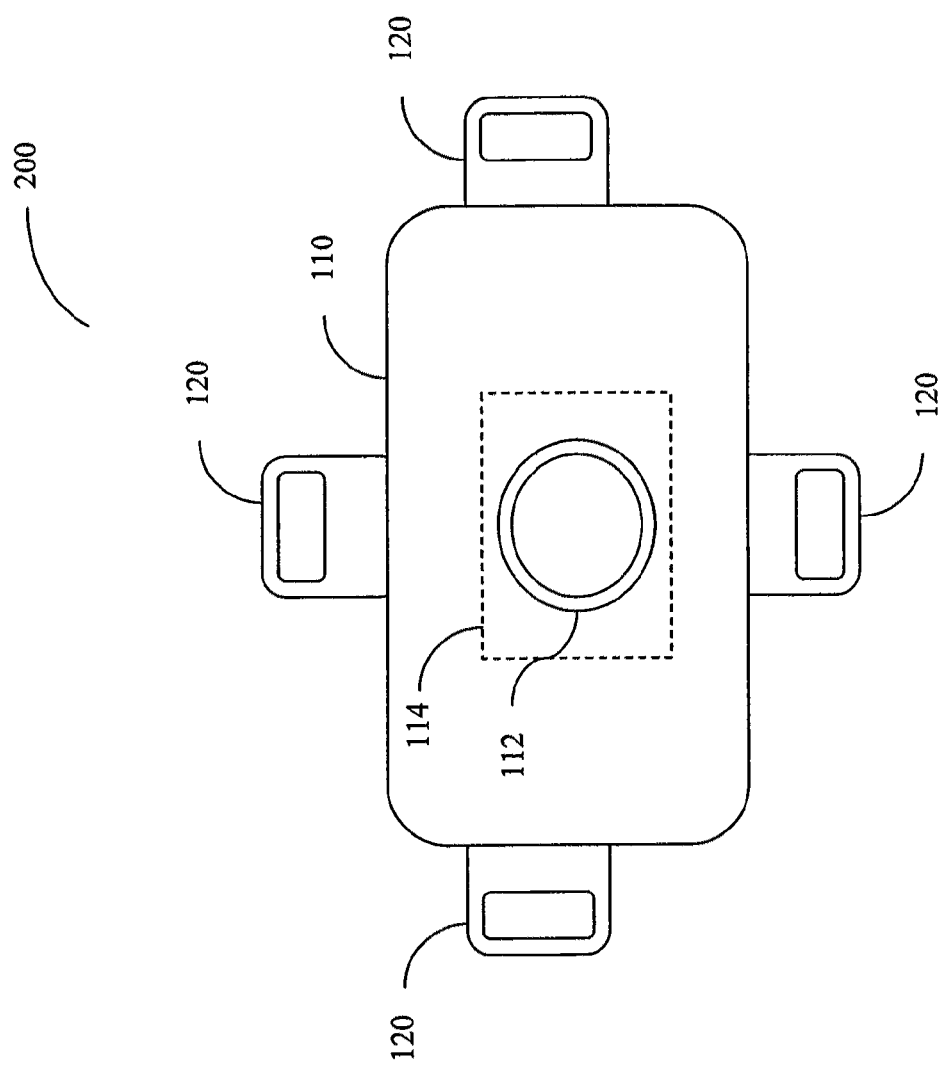
FIG. 2A is a line drawing of an exemplary image acquisition device in the system shown in FIG. 1 according to one embodiment of the present invention.

In one exemplary embodiment, as shown in FIG. 2A, image acquisition device 110 is part of acquisition device 200 having image sensor 112 and optical assembly 114 in front of image sensor 112 and configured to form an image of subject 101 on image sensor 114. Image sensor 114 may include, for example, 5-15 million Mega pixels made of photon detecting devices, such as charge-coupled devices ("CCD"), CMOS devices, and charge-injection devices ("CID"), among others. Each pixel includes three sub-pixels corresponding to three different color channels. The number of pixels used in image sensor 114 to capture the white-light and UV images can be varied or held fixed.

FIG. 2A also shows a plurality of light sources 120 as parts of acquisition device 200, including, for example, two flash light sources 120 on two sides of acquisition device 200, flash light source 120 on top of acquisition device 200, and optionally another flash light source 120 at the bottom of acquisition device 200. Having more than one flash light sources 120 allows more uniform exposure of subject 101 to light during imaging.

Different light sources may be configured to emit different colors or wavelengths of light, but the number of light sources 120 and their positions in system 100 can be varied without affecting the general performance of the system. In one exemplary embodiment, a portion of light sources 120 may be configured to illuminate subject 101 with white light, and another portion of light sources 120 may be configured to emit ultraviolet ("UV") light. Other light sources, such as the sun and surrounding lights may also be used without deviating from the principles and scope of the present invention.

Acquisition device 200 may also include other parts or components that are not shown, such as a shutter, electronics for allowing computing device 130 to control the shutter, flashings from light sources 120, and electronics for outputting captured images to computing device 130 for analysis, among others. To prevent saturation of the pixels in image sensor 114, acquisition device 200 may also include anti-blooming devices. At a minimum, acquisition device 200 may include image acquisition device 110 and at least one light source 120.

Figure 2B:
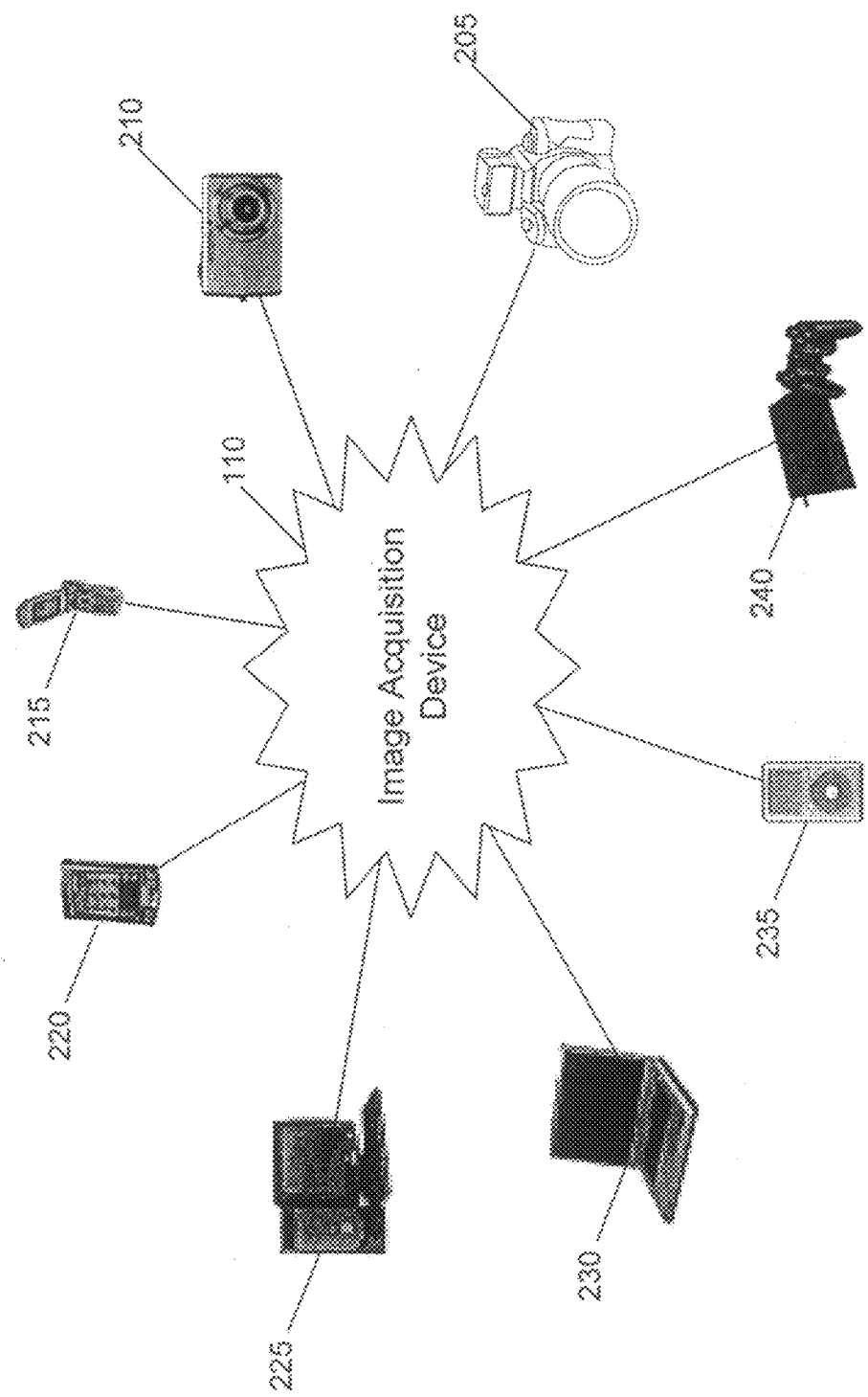
FIG. 2B is a schematic of exemplary image acquisition devices that can be converted into the image acquisition device shown in FIG. 2A.

Acquisition device 200, as shown in FIG. 2B, may be converted from a number of portable image acquisition devices 110, including, but not limited to, film-based camera 205 or digital camera 210, wireless phone 215 and other personal digital appliances ("PDAs") equipped with a camera such as PDA 220, desktop computer 225 and notebook computer 230 equipped with cameras such as webcams and other cameras, and digital music player 235, set-top boxes, video game and entertainment units 240, and any other device capable of acquiring digital images and having or interacting with at least one light source, such as light sources 120 on the top, bottom, and on the sides of image acquisition device 110.

Figure 2C:
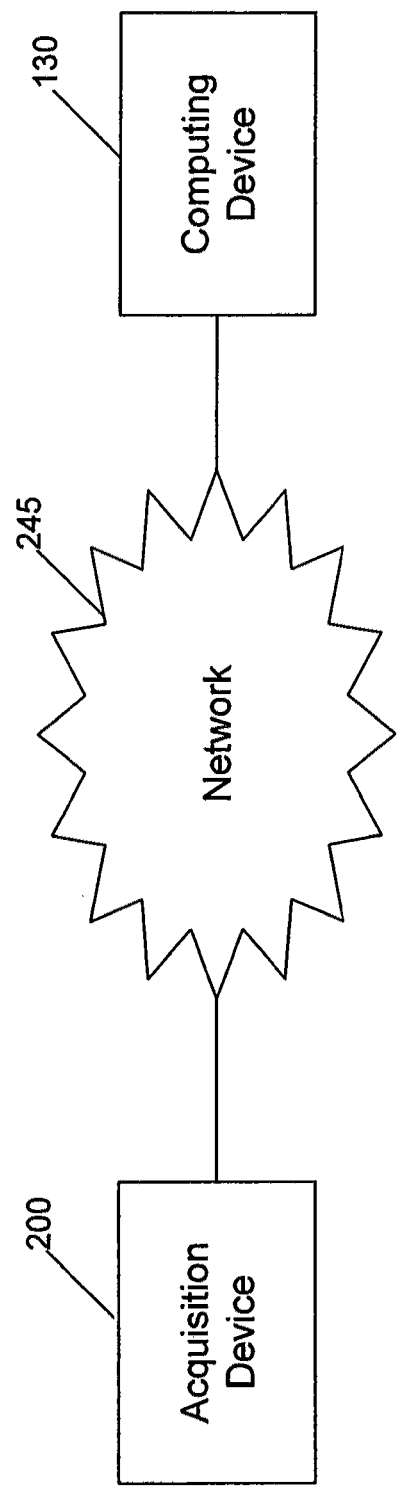
FIG. 2C is a schematic of an exemplary embodiment of the present invention showing an acquisition device coupled to a computing device via a network.

In one exemplary embodiment, shown in FIG. 2C, acquisition device 200 may be connected to computing device 130 via wired or wireless network 245. Accordingly, images acquired by acquisition device 200 are sent to computing device 130 via network 245 for analysis. The results of the analysis may then be sent to a user of acquisition device 200 via a number of communication means, including, but not limited to, email, fax, voice mail, and surface mail, among others. Alternatively, the results may be posted on a web site or another medium for later retrieval by the user.

In another exemplary embodiment, acquisition device 200 may include a portion or all of the modules for carrying out different aspects of the invention as summarized above and described in more detail herein below. In this exemplary embodiment, the images acquired by acquisition device 200 may be analyzed on the device itself, thereby eliminating the need for the images to be sent to separate computing device 130 connected to acquisition device 200 via network 245. Alternatively, a partial analysis may be performed in acquisition device 200 and the images may still be sent to separate computing device 130 for further analysis.

Light sources 120 that are on the top and at the bottom of acquisition device 200 may be white light sources and light sources 120 on the sides of acquisition device 200 may be UV light sources. The white light sources can be conventional off-the-shelf flash light sources, such as flash light source 300 shown in FIG. 3A. Each of UV light sources 120 can be one converted from light source 300 by changing a low-pass filter 310 in front of light source 300 into UV filter 310.

Figure 3B:
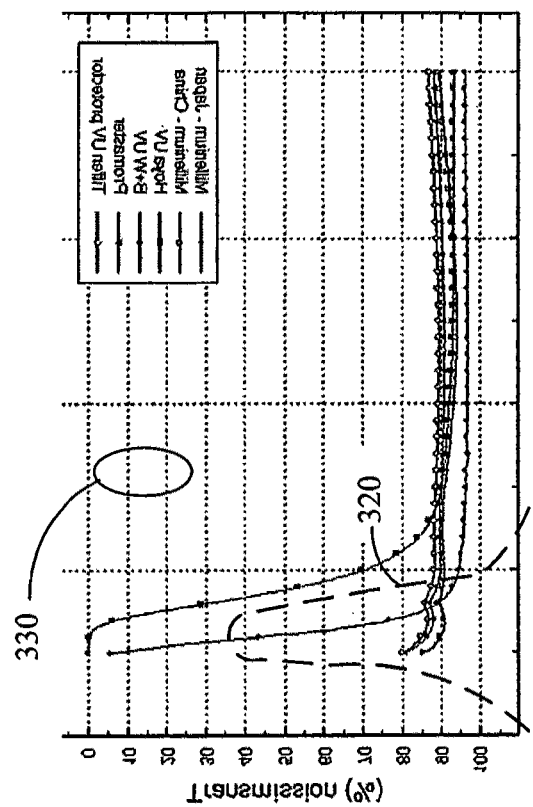
FIG. 3B is a chart illustrating a transmission spectrum of a UV bandpass filter as compared with transmission spectra of other white-light filters.
Figure 3A:
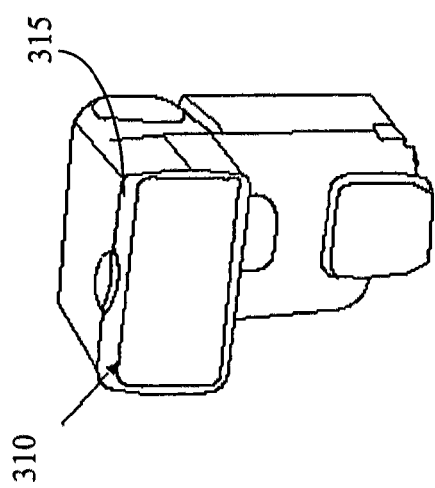
FIG. 3A is a line drawing of a flash light source in the system shown in FIG. 1 according to one exemplary embodiment of the present invention.

In one exemplary embodiment, as shown in FIG. 3B, UV filter 310 is a bandpass filter that provides transmission spectrum 320 having a width of about 50 nm and a peak wavelength of about 365 nm. In comparison, low-pass filter 310 would provide a transmission spectrum, such as the ones shown in FIG. 3B as spectra 320, that drop sharply to near zero in the UV wavelength range and stay relatively flat in the visible wavelength range.

In addition to the white-light and UV filters, some or all of light sources 120 may also have infrared absorption filters 315 installed. The infrared absorbing filters help to prevent heat from light sources 120 to be applied to subject 101 by filtering out wavelengths greater than, for example, 700 nm.

Figure 4:
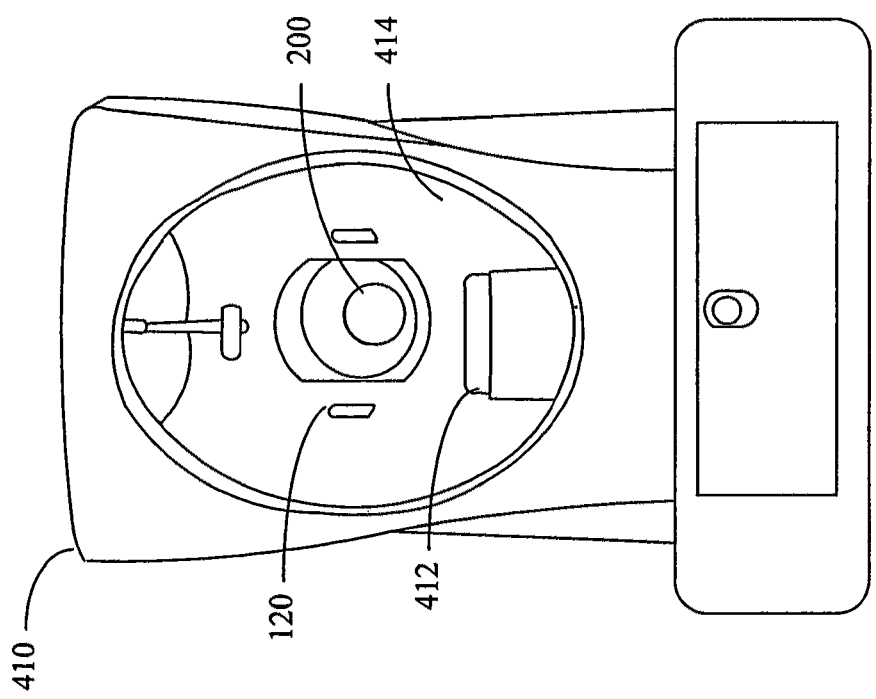
FIG. 4 is a line drawing of an imaging box on which the image acquisition device show in FIG. 2A is installed.

Acquisition device 200 may be installed in an imaging box, such as box 410 shown in FIG. 4, which helps to prevent ambient light from entering sensor 212 and interfering with the analysis of skin conditions. FIG. 4 also shows acquisition device 200 placed near a center in the back of box 410, light sources 120 on top and sides of optical assembly 214, and a pedestal or chin rest 412 near opening 414 of box 410 on which subject 101 can rest and stay still during imaging acquisition.

Figure 5:
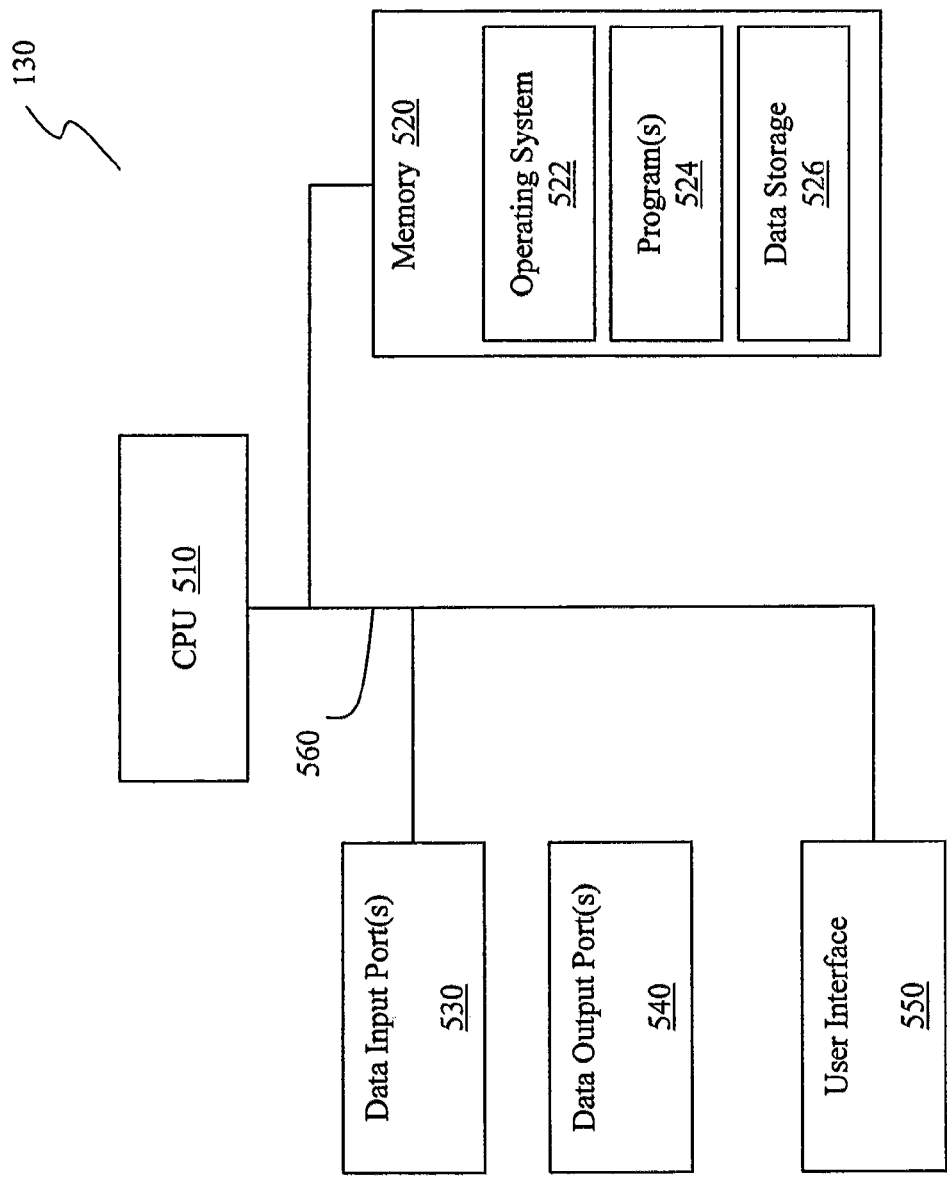
FIG. 5 is a simplified block diagram of a computing device in the system illustrated in FIG. 1 according to one embodiment of the present invention.

In one exemplary embodiment of the present invention, as shown in FIG. 5, computing device 130 can be any computing device having a central processing unit ("CPU") such as CPU 510, memory unit 520, at least one data input port 530, at least one data output port 540, and user interface 550, interconnected by one or more buses 560. Memory unit 520 preferably stores operating system software 522 and other software programs including program 524 for auto-identification. Memory unit 520 further includes data storage unit 526 for storing image data transferred from acquisition device 200 through one of the at least one data input port 530 and for storing prior skin condition results associated with subject 101 and other data or data structures generated during current execution of program 524, as discussed below.

Program 524 may be organized into modules which include coded instructions and when executed by CPU 510, cause computing device 130 to carry out different aspects, modules, or steps of a method for automatically identifying a person according to the present invention. All or part of memory unit 520, such as database 526, may reside in a different geographical location from that of CPU 510 and be coupled to CPU 510 through one or more computer networks.

Program 524 may also include a module including coded instructions, which, when executed by CPU 510, cause computing device 130 to provide graphical user interfaces ("GUI") for a user to interact with computing device 130 and direct the flow of program 524.

Figure 6A:
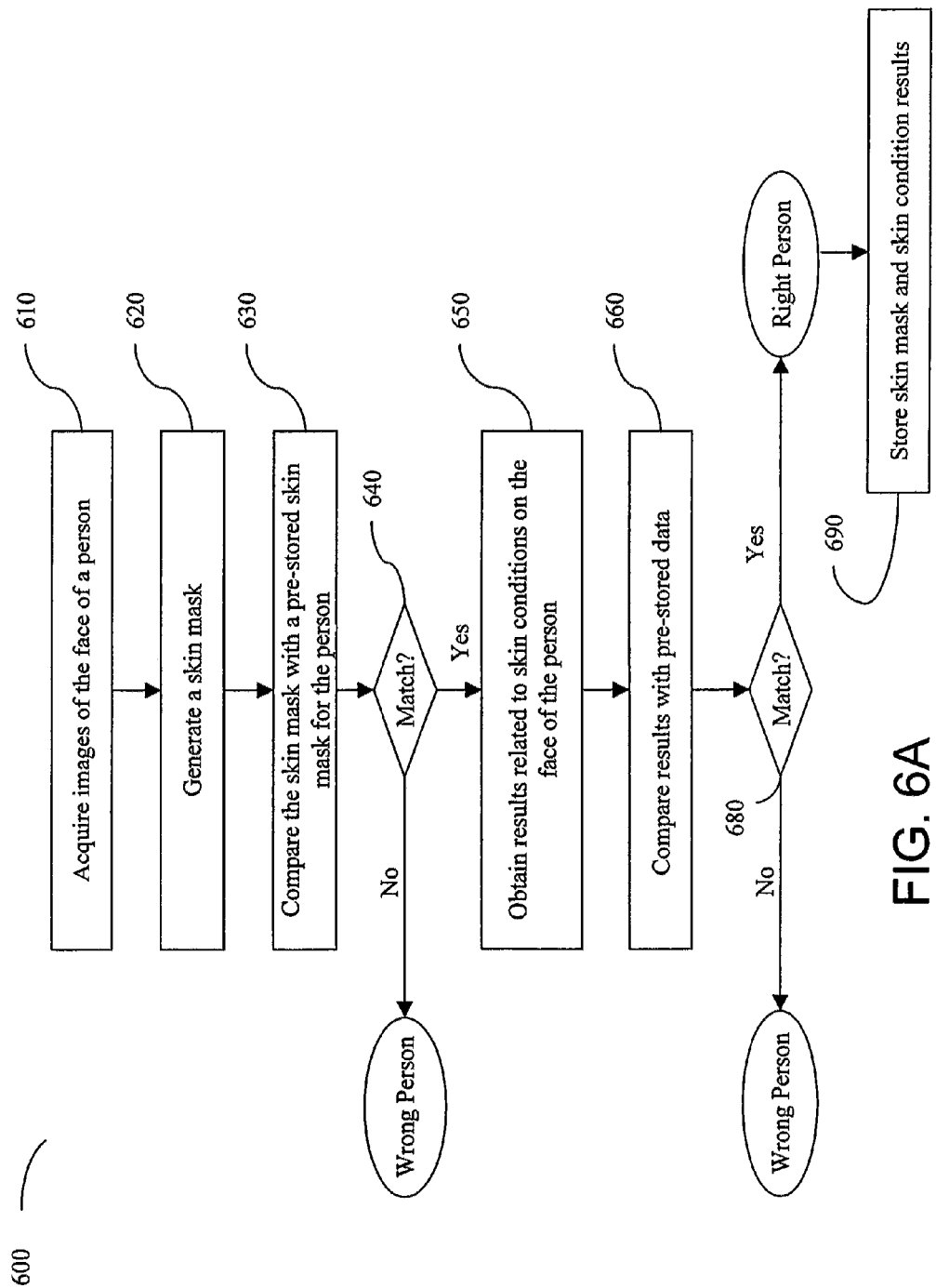
FIG. 6A is a flowchart illustrating a method for auto-identification using digital images according to one embodiment of the present invention.

FIG. 6A is a flowchart illustrating method 600 for automatically identifying a person using digital images according to the present invention. As shown in FIG. 6A, method 600 comprises module 610 in which digital images including a first white-light image and a first UV image of subject 101 are acquired, module 620 in which a skin map or skin mask is generated from the first white-light image, module 630 in which the skin mask is compared with a pre-stored skin mask of subject 101, and module 640 in which a decision is made regarding whether the two skin masks substantially match. The match does not have to be perfect. As a non-limiting example, a substantial match is found if more than 70-90% of the elements in the two skin masks match.

If a substantial match is not found between the two skin masks, subject 101 is not identified, and an error message such as "wrong person" or "person unknown" is returned. Otherwise, method 600 proceeds to module 650 to obtain results associated with certain skin conditions using at least the UV image. In subsequent modules 660 and 680, database 526 is consulted to compare the current results with pre-stored data in database 526, and a decision is made whether subject 101 is the right person, i.e., identified, or the wrong person, i.e., not identified, based on the comparison.

If it is determined that subject 101 is the right person, module 690 interacts with database 526 to store the newly obtained skin mask and the results associated with the skin conditions for future reference, in additional to or in place of the pre-stored data. If it is determined that subject 101 is the wrong person, an error message such as "wrong person" or "person unknown" is returned.

Results for "wrong persons" may be stored in database 526 for future reference by, for example, law enforcement officials. In this case, database 526 may be a useful repository of names of people that have tried to hide their identity to breach a security measure.

Modules 620 through 640 related to the skin map or skin mask are optional, and system 100 may be used to identify a person based just on the skin conditions obtained in module 650. The skin conditions may include, but are not limited to, skin tone, UV damage, pores, wrinkles, hydration levels, collagen content, skin type, topical inflammation or recent ablation, keratosis, deeper inflammation, sun spots, different kinds of pigmentation including freckles, moles, growths, scars, acne, fungi, and other artifacts.

Figure 6B:
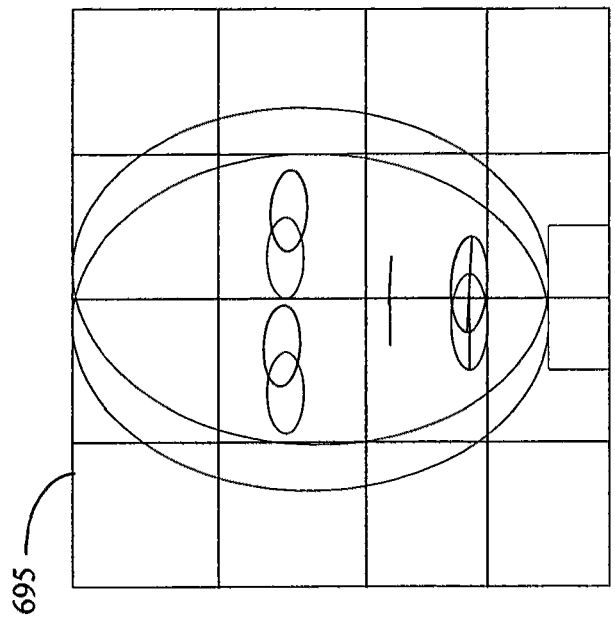
FIG. 6B is a line drawing illustrating the alignment of a subject's face performed prior to comparing the skin mask with a pre-stored skin mask for the person at step 630 of the flowchart of FIG. 6A.
Figure 6B:
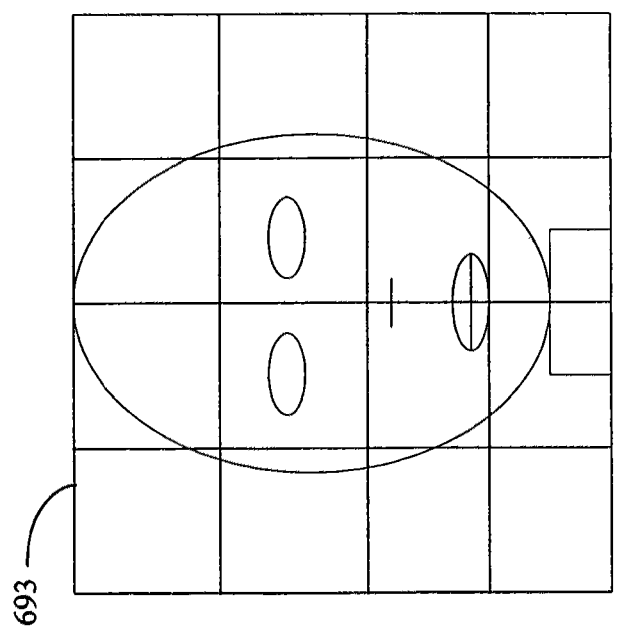

Prior to comparing the skin mask with the pre-stored skin mask at step 630, an alignment of the subject's portion of a body surface being analyzed, such as the subject's face, is performed as shown in FIG. 6B. The alignment ensures that images acquired for generating the skin mask are aligned with the images acquired for generating the pre-stored skin mask. A grid is used to align portions of the body surface of the subject being analyzed, such as the subject's nose, eyes, and mouth, with the same portions displayed on previous images acquired for generating the pre-stored skin mask.

For example, image 693 shows an image of the subject's face acquired for generating the pre-stored skin mask being displayed on a grid for more accurate placement of the face's features, such as the subject's eyes, nose, and mouth. Image 695 shows the same image on a grid overlying an image being acquired at a later time for generating a current skin mask for the subject. The two images are aligned to guarantee that the results obtained at the two different times reflect the same positioning of face features at the two times.

Figure 7:
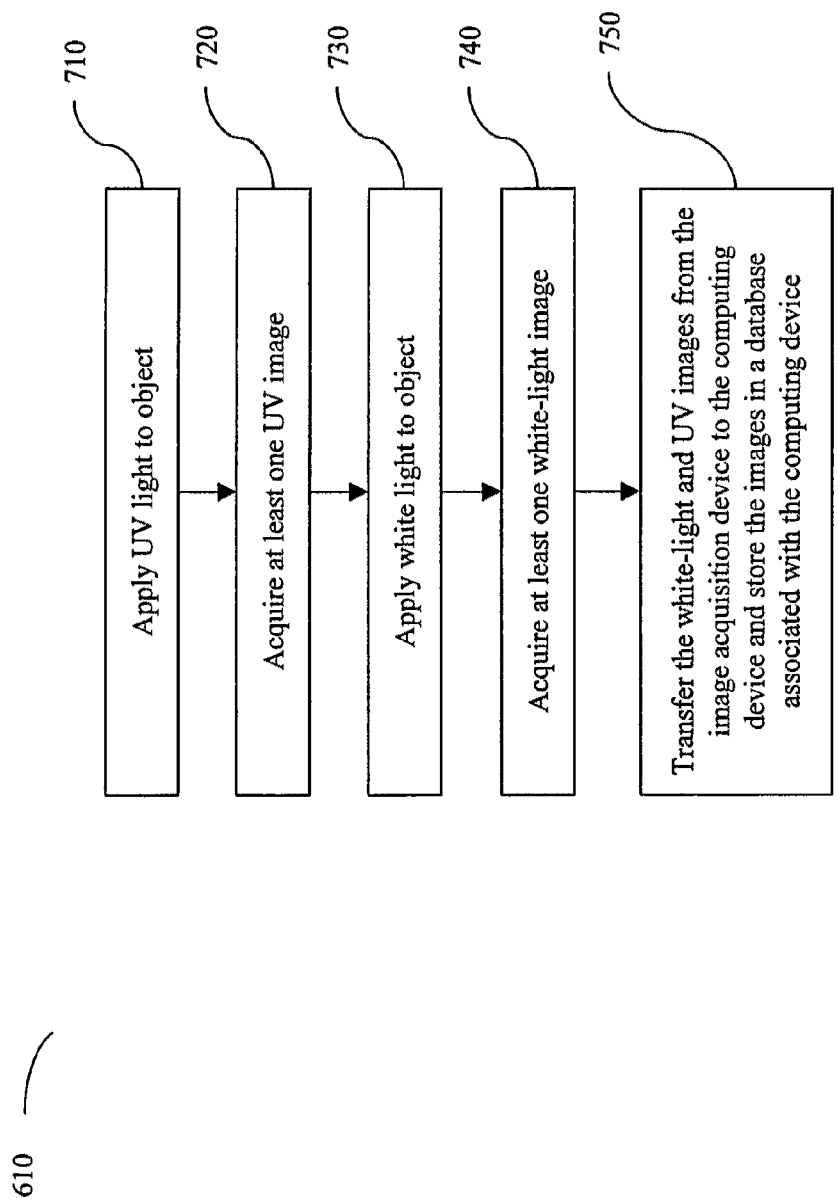
FIG. 7 is a flowchart illustrating process steps for acquiring digital images of a body surface according to one embodiment of the present invention.
Figure 8A:
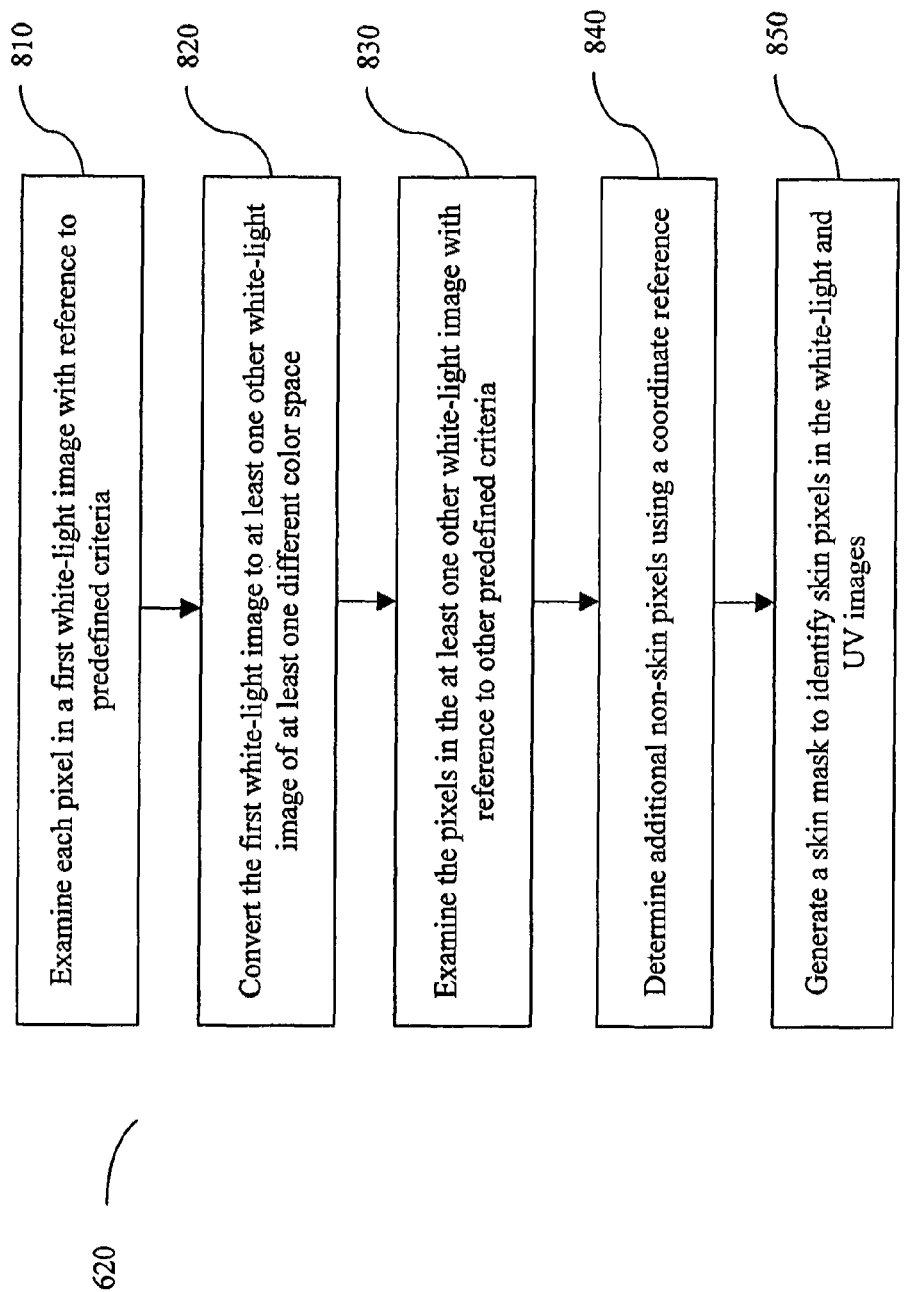
FIG. 8A is a flowchart illustrating process steps for generating a skin map according to one embodiment of the present invention.

FIG. 7 illustrates process steps in module 610 for acquiring the digital images of subject 101 in accordance with the present invention. As shown in FIG. 8A, module 710 includes step 710 in which UV light sources 120 are turned on to send a flash of UV light to subject 101. At about the same time, is opened at step 720 so that the first UV image is captured by sensor 114.

The application of ultraviolet ("UV") light to dermatology and health care has been researched and utilized in order to aid in the detection and diagnosis of a number of afflictions and skin disorders. Given that most living organisms fluoresce upon excitation through the absorption of light, a phenomenon known as auto-fluorescence, it has been shown that different organisms can be classified through their Stokes shift values. Stokes shift, as generally used herein, is the difference between the peak wavelength or frequency of an absorption spectrum and the peak wavelength or frequency of an emission spectrum. Furthermore, UV light can penetrate deeper into the skin than visible light, making it possible to detect subsurface skin conditions (i.e., skin conditions below the and allowing for early diagnosis of melanoma and other skin cancer symptoms.

Therefore, by acquiring the first UV image, the embodiments of the present invention are able to combine the knowledge of auto-fluorescence of the skin and image processing technologies to results related to subsurface skin condition, as described in more detail below. By taking the UV image, method 600 is also safeguarded against attempts to defraud auto-identification system 100 by using a picture or mold because a picture or mold, being made of different materials, would not fluoresce the same way as a person's skin, meaning the materials would not fluoresce with the same spectrum in comparison to skin.

Module 610 further includes step 730 in which white-light sources 120 are turned on to send a flash of white light to subject 101. At about the same time, the shutter of acquisition device 200 is opened at step 740 so that the first white-light image is captured by sensor 114. Module 610 further includes step 750 in which the white-light and UV images are transferred from acquisition device 200 into computing device 130 using conventional means and stored in database 526 for subsequent processing, and in which appropriate image conversion and/or initial processing are performed as discussed above.

Each of the white-light and UV images includes a plurality of pixels. Each pixel in the white-light or UV image corresponds to a pixel in sensor 114. Furthermore, each pixel in the UV image corresponding to a respective pixel in the white-light image, and vise versa. In one exemplary embodiment, each of the pixels in sensor 114 includes three subpixels corresponding to three color channels for sensing three color components in a received light signal. Thus, each pixel in the white-light and UV image also includes values associated with the three color channels, which are referred to sometimes in this document as pixel values. The pixel values may range, for example, between 0 and 255.

The images captured by sensor 114 and the images used by computing device 130 may be of different formats. An appropriate image conversion software may be used by computing device 130 to convert an image format used by acquisition device 200, such as BMP, TIFF, or FITS, to another image format used by computing device 130. The images from acquisition device 200, after any conversion, may be initially processed by computing device 130 using conventional techniques for dark current and/or intensity correction, image manipulation or enhancement, and/or to take off some pixels that clearly do not carry any information for identification, before being used for analyzing skin conditions.

Thus, each of the acquired digital images, such as the white-light and UV images, is referred to as either the original image acquired by acquisition device 200 or an image derived from the original image after one or more format or color space conversions, and some initial processing such as those stated above.

Generally, subject 101, or part of it, that is captured in the images include both skin and non-skin portions, such as hair, clothing, eyes, lips, nostrils, etc. Furthermore, some of the objects surrounding subject 101 may also be captured in the images. Therefore, the pixels in the first white-light and UV images often include both skin pixels, which correspond to pixels in sensor 114 that have captured signals from the skin portions of subject 101, and non-skin pixels, which correspond to pixels in sensor 114 that have captured signals from non-skin portions of subject 101 or from objects surrounding subject 101. The skin mask can be used to help identify the skin pixels and non-skin pixels in the white-light and UV images.

FIG. 8A is a flowchart illustrating the process steps in module 620 for generating the skin mask. As shown in FIG. 8A, module 620 includes step 810 in which properties of each pixel in the white-light image are examined with reference to predefined criteria for skin pixels. The properties of a pixel may include the pixel values, the pixel's position in the image, and/or pixel values of one or more corresponding pixels in one or more other images, as discussed in more detail herein below.

The criteria for skin pixels may be different for different color spaces, as illustrated in FIG. 8B, which lists in table 860, for each of a plurality of color spaces, ranges of values associated with different color channels for likely skin pixels. For example, assuming the first white-light image being in a first color space, such as the red-green-blue ("RGB") color space, pixels that have the red channel (channel 1) values in the range of 105-255, the green channel (channel 2) values in the range of 52-191, and the blue channel (channel 3) values in the range of 32-180 are likely to be skin pixels.

Figure 9:
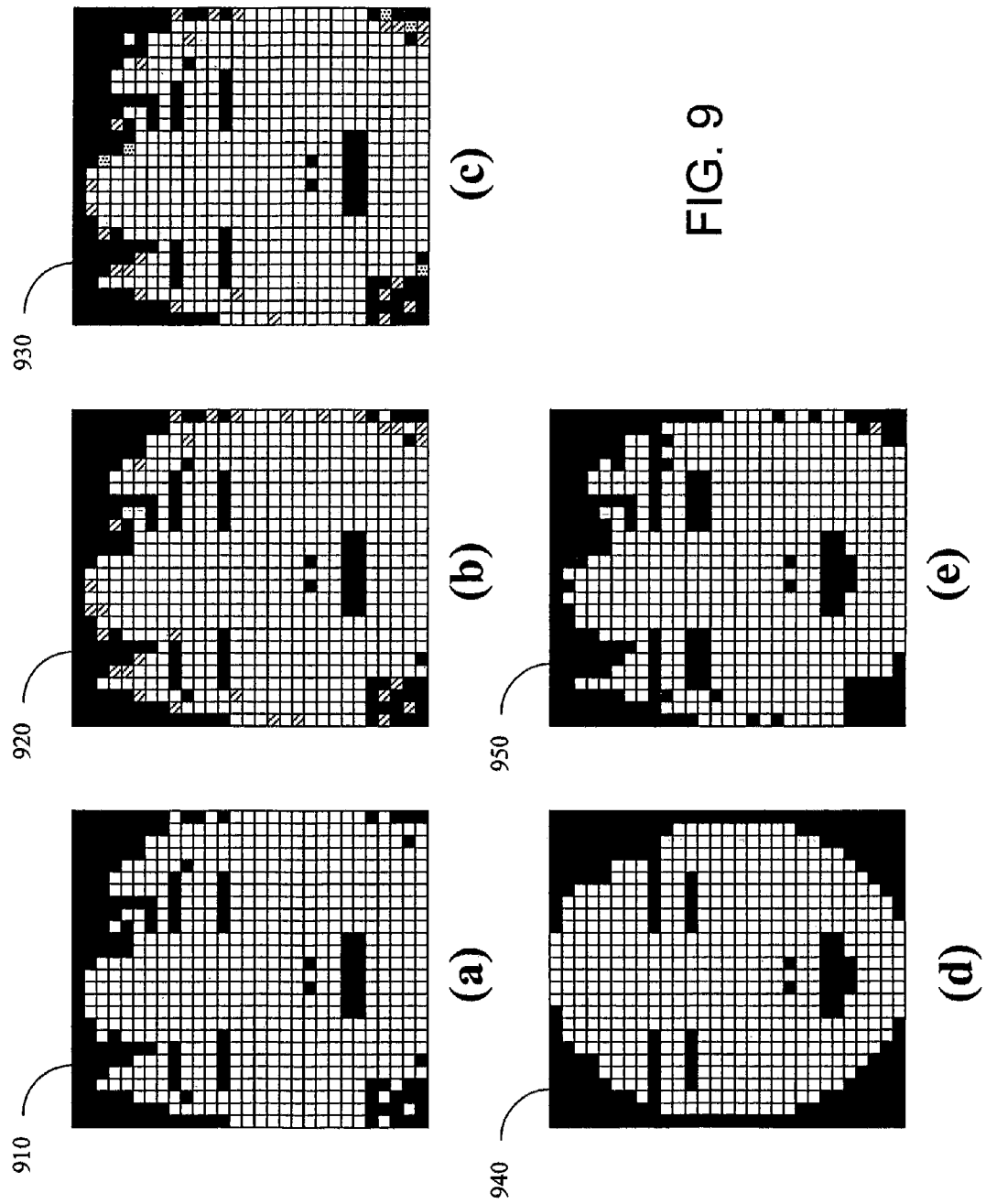
FIGS. 9(a) to (e) are simplified block diagrams illustrating a method for generating a skin mask according to one embodiment of the present invention.

Thus, as shown in FIG. 9(*a*), after examining the pixels in first white-light image 910, part of the pixels in first white-light image 910 are considered to be possible or likely skin pixels, as illustrated by the white blocks in FIG. 9(*a*), and the rest of the pixels in first white-light image 910 are determined to be non-skin pixels, as illustrated by the black blocks in FIG. 9(*a*).

To be more accurate in constructing the skin mask, module 620 further includes step 820 in which first white light image 910 is converted to at least one other white light image in at least one other color space, such as white-light image 920 in a second color space illustrated in FIG. 9(*b*), and white-light image 930 in a third color space illustrated in FIG. 9(*c*). Each pixel in the at least one other white-light image corresponds to a respective pixel in the first white-light image. The first, second, and third color spaces can be different ones selected from commonly known color spaces, such as the RGB, YIQ, LAB, YcBcR, and HSV color spaces, and/or proprietary color spaces.

Module 620 further includes step 830 in which for each of the at least one other white light images, the pixels corresponding to the likely skin pixels in the first white-light image 910 are further examined against criteria for skin pixels associated with the respective color space. For example, in second white-light image 920, all pixels corresponding to non-skin pixels in first white-light image 910 are determined to be non-skin pixels and are illustrated in FIG. 9(*b*) as black blocks, and pixels corresponding to likely skin pixels in first white-light image 910 are further examined against criteria for skin pixels associated with the second color space. As a result, more pixels would be determined as non-skin pixels, which are shown in FIG. 9(*b*) as blocks with stripes. The rest of the pixels in second white-light image 920 are considered to be likely skin pixels and are illustrated by the white blocks in FIG. 9(*b*).

Furthermore, in third white-light image 930, all pixels corresponding to non-skin pixels in second white-light image 920 are determined to be non-skin pixels and are illustrated in FIG. 9(*c*) as black blocks and blocks with stripes, and pixels corresponding to likely skin pixels in second white-light image 920 are further examined against criteria for skin pixels associated with the third color space. As a result, more pixels would be determined as non-skin pixels, which are shown in FIG. 9(*c*) as blocks with dots. The rest of the pixels in third white-light image 920 are considered to be likely skin pixels and are illustrated by the white blocks in FIG. 9(*c*). This may continue until a last one of the at least one other white-light image is examined.

To be even more accurate in identifying the skin pixels and to make sure that non-skin pixels are not considered in analyzing the skin conditions, module 620 may include a further step 840 in which coordinate reference or template 940, such as the one shown in FIG. 9(*d*) is used to classify more of the likely skin pixels as non-skin pixels. Coordinate reference or template 940 may be pre-stored in database 526 together with a plurality of other coordinate references in memory unit 520 of computing device 130, and selected as being a suitable one for subject 101.

The coordinate reference defines certain pixels in any of the white-light images as non-skin pixels (shown as black blocks) based on their coordinates or positions in the image. So if any of the likely skin pixels in the last one of the at least one other white-light image have coordinates that are defined as coordinates for non-skin features in coordinate reference 940, these pixels are deemed to be non-skin pixels. The rest of the likely skin pixels in the last one of the at least one other white-light image are finally identified as skin pixels, and all of the pixels in each of the other white-light images or the UV image that correspond to the skin pixels in the last one of the at least one other white-light image are also identified as skin pixels. The rest of the pixels in each of the white-light or UV images are considered as non-skin pixels.

Module 720 further includes step 850 in which the skin map or skin mask is generated. In one exemplary embodiment of the present invention, as shown in FIG. 9(*e*), skin map 950 includes a matrix having a plurality of matrix elements, each corresponding to a pixel in any of the white-light or UV images of subject 101. Those matrix elements corresponding to skin pixels in each of the white-light and UV images (shown as white blocks in FIG. 9(*e*)) are defined as skin elements, and each is assigned a first value. In contract, those matrix elements corresponding to non-skin pixels (shown as black blocks in FIG. 9(*e*)) are defined as non-skin elements, and each is assigned a second value that is distinct from the first value. In one exemplary embodiment, the first value is a large number, such as 255, and the second value is a small number, such as 0.

Figure 10:
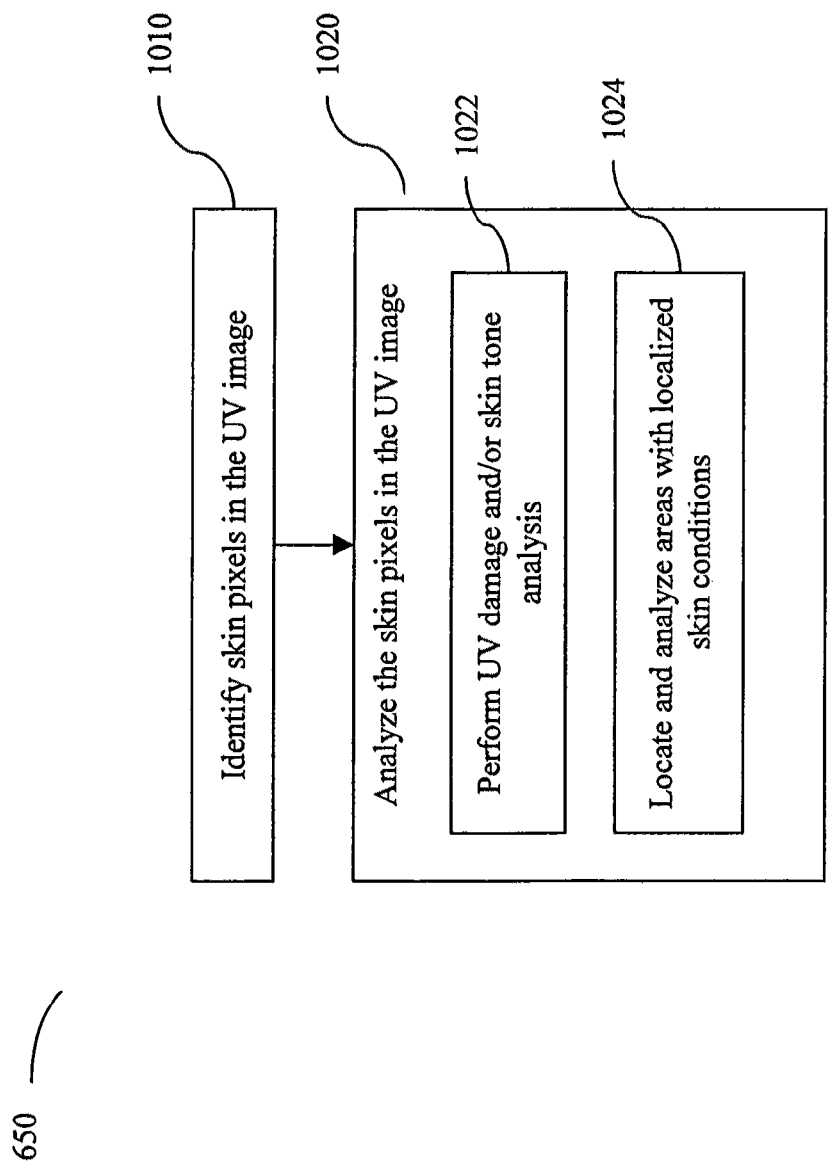
FIG. 10 is a flowchart illustrating process step for obtaining skin condition results according to one embodiment of the present invention.

Since non-skin pixels may interfere with the analysis of skin conditions, they are identified and/or extracted in step 650 before the skin condition results are obtained. Thus, as shown in FIG. 10, module 650 in method 600 includes step 1010 for identifying, on a pixel by pixel basis, skin pixels and/or non-skin pixels in the white-light and/or UV image. Whether a pixel in any of the white-light and UV images is a skin pixel can be easily determined by looking up the value contained in the corresponding element in skin map 950. Since generating the skin mask is optional, without the skin mask, the method steps for determining skin pixels described above can be used in module 650 to determine the skin pixels.

Module 650 further includes sub-modules 1020 for obtaining results associated with at least one skin condition by analyzing information in the skin pixels in the white light and UV images. Sub-modules 1020 may include sub-modules 1022 for performing UV damage and skin tone analysis, and sub-modules 1024 for locating and quantifying certain skin conditions, such as one or more types of pores, wrinkles, artifacts, etc. Sub-modules 1020 may also include sub-modules for examining other skin conditions, such as hydration levels, collagen content, skin type, moles, pigmentation, level of oil flow, keratosis, topical and deeper inflammation, recent ablations, sun spots, growths, scars, acne, fungi, erythema, and/or any other skin conditions identifiable using the information in one or both of the white-light and UV images according to knowledge known to those familiar with the art. Sub-modules 1020 may also include sub-modules for performing feature measurements such as the size and volume of a lip, nose, eyes, ears, chins, cheeks, forehead, eyebrows, among other features.

Figure 11:
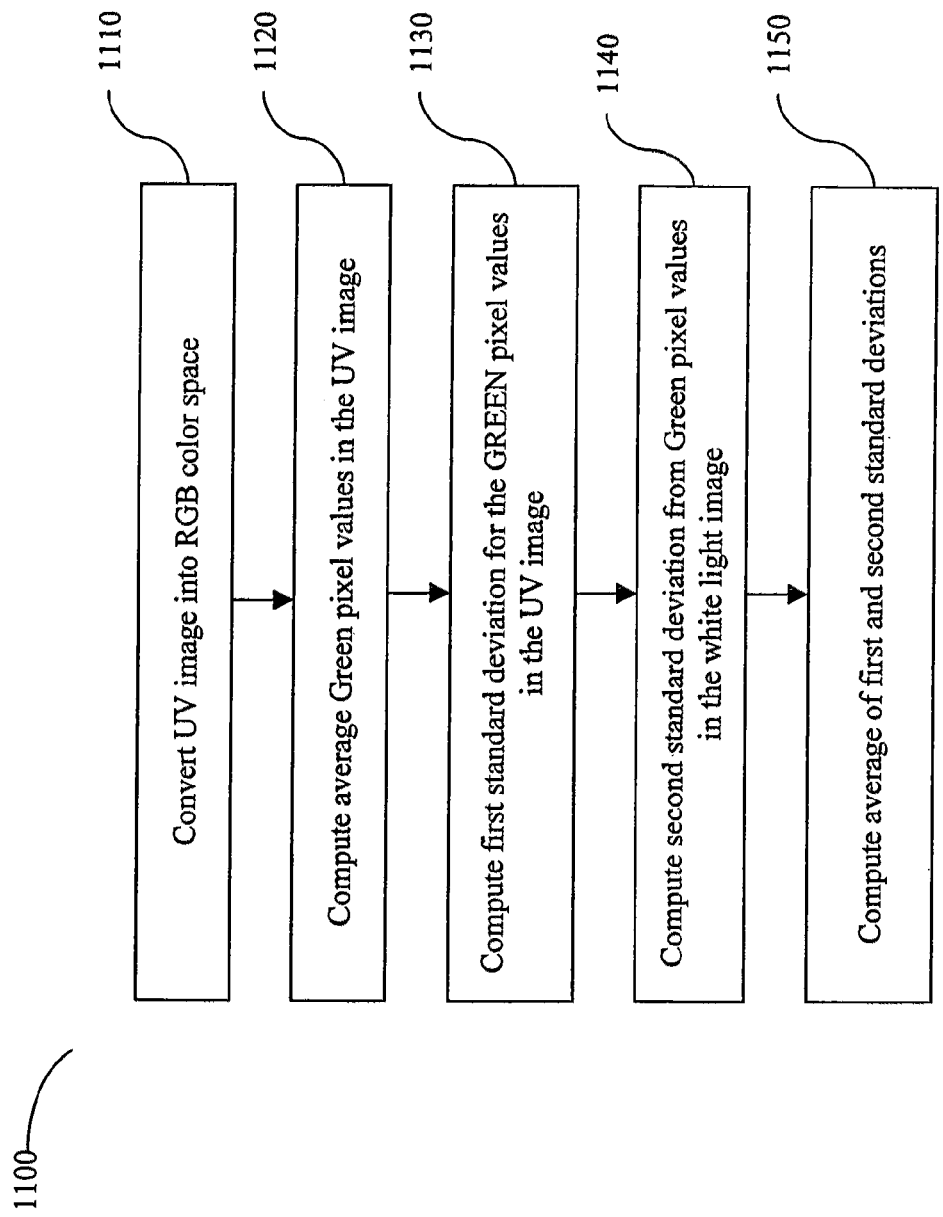
FIG. 11 is a flowchart illustrating process steps for obtaining UV damage results from the digital images according to one embodiment of the present invention.

In one exemplary embodiment of the present invention, sub-modules 1022 include a sub-module 1100 for obtaining UV damage results using the skin pixels in at least the first UV image, as illustrated in FIG. 11. Sub-module 1100 includes step 1110 in which the first UV image, if it is not in the RGB color space, is converted into a second UV image in the RGB color space, step 1120 in which an average is computed from all of the green channel values in the skin pixels of the first UV image or in the second UV image if a conversion is made in step 1110, and step 1130 in which a first standard deviation is computed from the green channel values in the skin pixels.

The first standard deviation value can be used to indicate quantitatively the amount of UV damage in the skin of subject 101. Alternatively or additionally, sub-module 1100 may include further step 1140 in which a second standard deviation is computed from the green channel values in the skin pixels of one of the white-light images, and an average of the first and second standard deviation values can be used to indicate quantitatively the amount of UV damage in the skin of subject 101.

Figure 12:
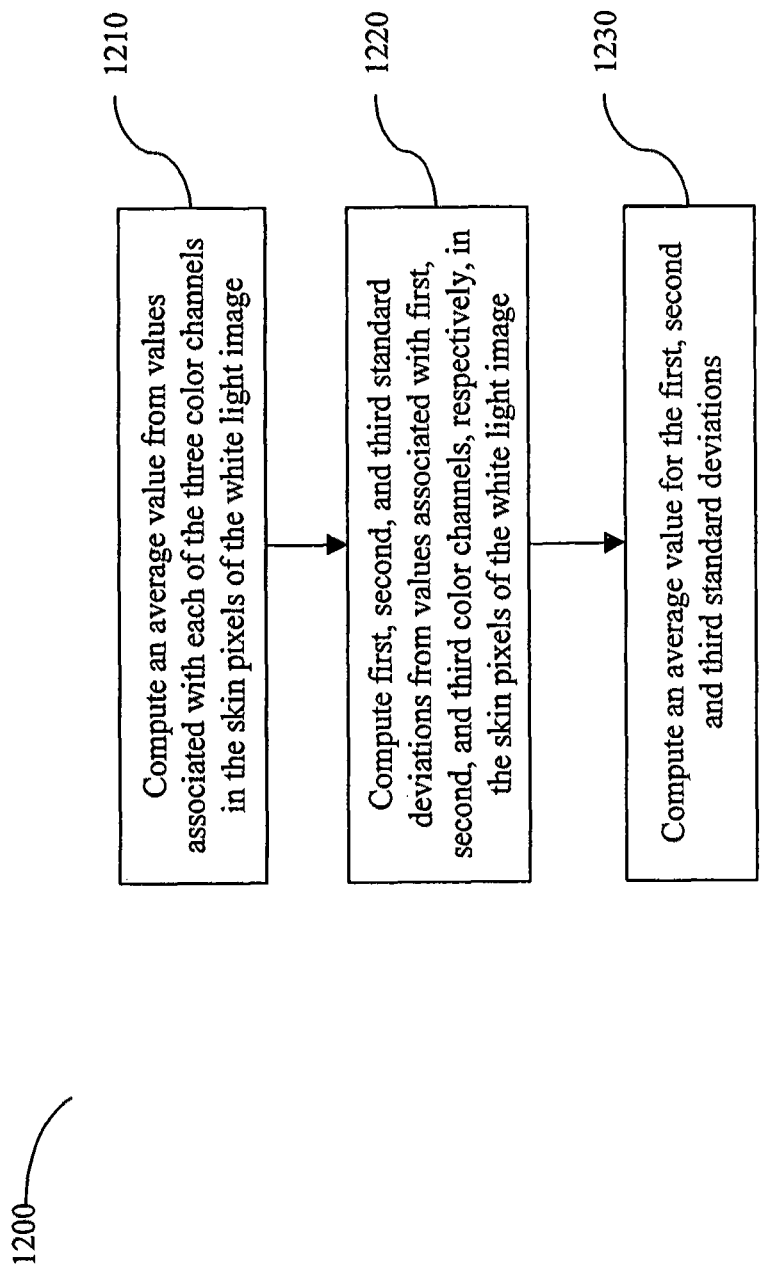
FIG. 12 is a flowchart illustrating process steps for obtaining skin tone results from the digital images according to one embodiment of the present invention.

In one exemplary embodiment of the present invention, sub-modules 1022 include sub-module 1200 for obtaining skin tone results using the skin pixels in any of the white light images, as illustrated in FIG. 12. Sub-module 1200 includes step 1210 in which an average is computed from values associated with each of the three color channels in the skin pixels of the white-light image, step 1220 in which a standard deviation is computed for each of the color channels in the skin pixels, and step 1230 in which an average of the standard deviation values computed in step 1220 is obtained as a measure of the skin tone of subject 101. Since skin tone may be easily changed by applying makeup, use of the skin tone results for auto-identification may be optional or as a reference.

Figure 13A:
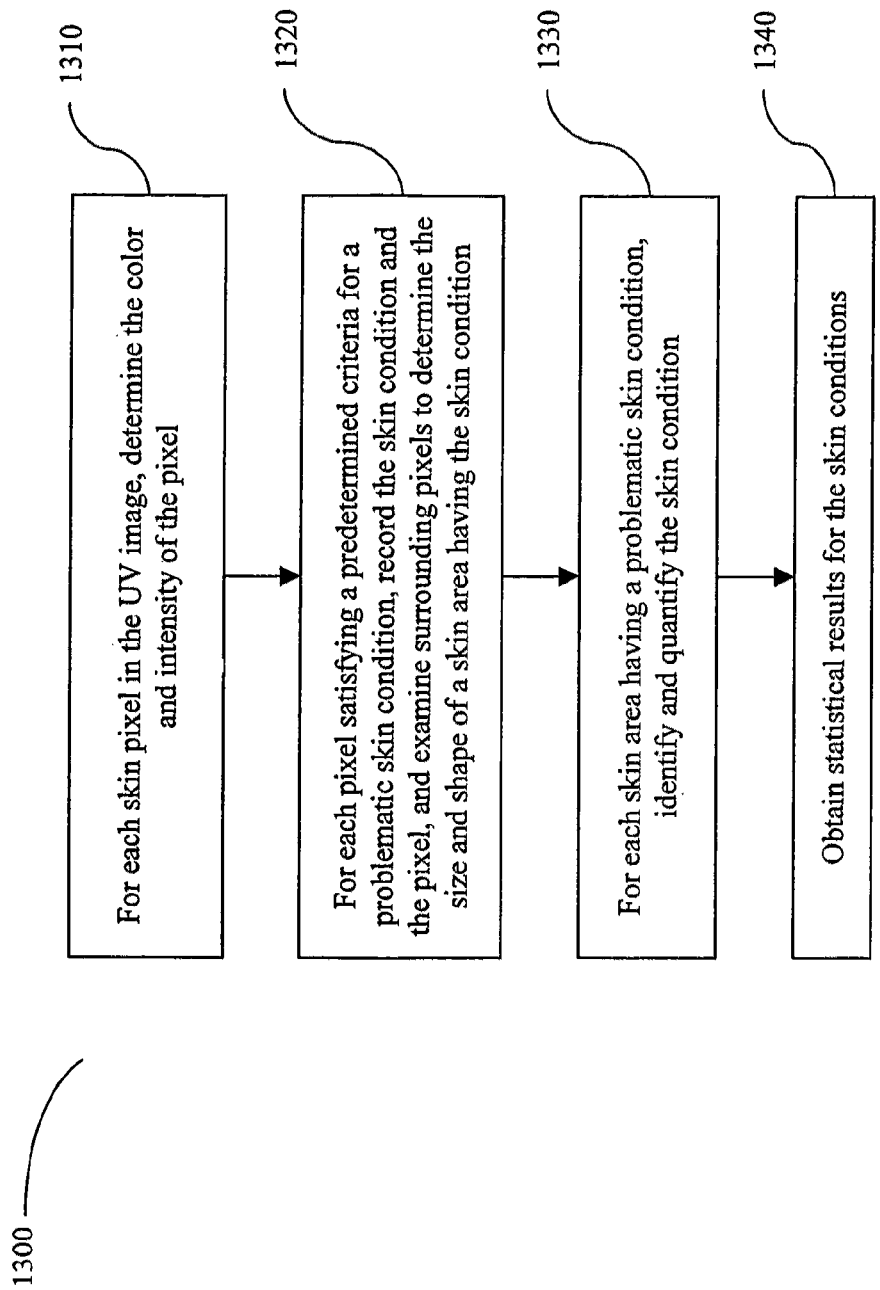
FIG. 13A is a flowchart illustrating process steps for obtaining results related to certain localized skin conditions according to one embodiment of the present invention.

In one exemplary embodiment of the present invention, sub-modules 1024 include sub-module 1300 for obtaining results related to certain skin conditions, as illustrated in FIG. 13A. Sub-module 1300 includes step 1310 in which color and intensity values are computed from the pixel values associated with each pixel in one of the UV images, and step 1320 in which the color and intensity values for each pixel are examined with reference to at least one lookup table to determine if the pixels satisfy the criteria for any of a plurality of skin conditions listed in the at least one lookup table. The at least one lookup table may include those compiled using knowledge known in the art, or through proprietary research and/or empirical studies.

FIG. 13B illustrates exemplary lookup table 1350 that may be included in the at least one lookup table. For example, if a first skin pixel has a white color and an intensity value exceeds 130, the skin pixel is likely one of a group of contiguous pixels that have captured fluorescence coming from an inflamed pore upon illumination by a UV flash. To confirm, surrounding skin pixels are also examined to see if some of them are also white in color and have intensity values over 130. If none or few of the pixels satisfy this criteria, the first skin pixel is not associated with an inflamed pore. Otherwise, an inflamed pore is identified, and in step 1330, the number of skin pixels associated with the inflamed pore is determined as a measure for the size of the pore on subject 101, and an average of the intensity value associated with the number of skin pixels is computed as a quantitative indication of the severity of the pore.

Sub-module 1300 further includes step 1340 in which statistical results such as a total number of all types of pores, and/or a total number of each of the several types of pores listed in FIG. 13B are computed.

Note that FIG. 13B only illustrates some examples of the criteria that can be used by module 1300. Alternatively or additionally, module 1300 may use other lookup tables derived from information such as those known in the art.

Figure 14:
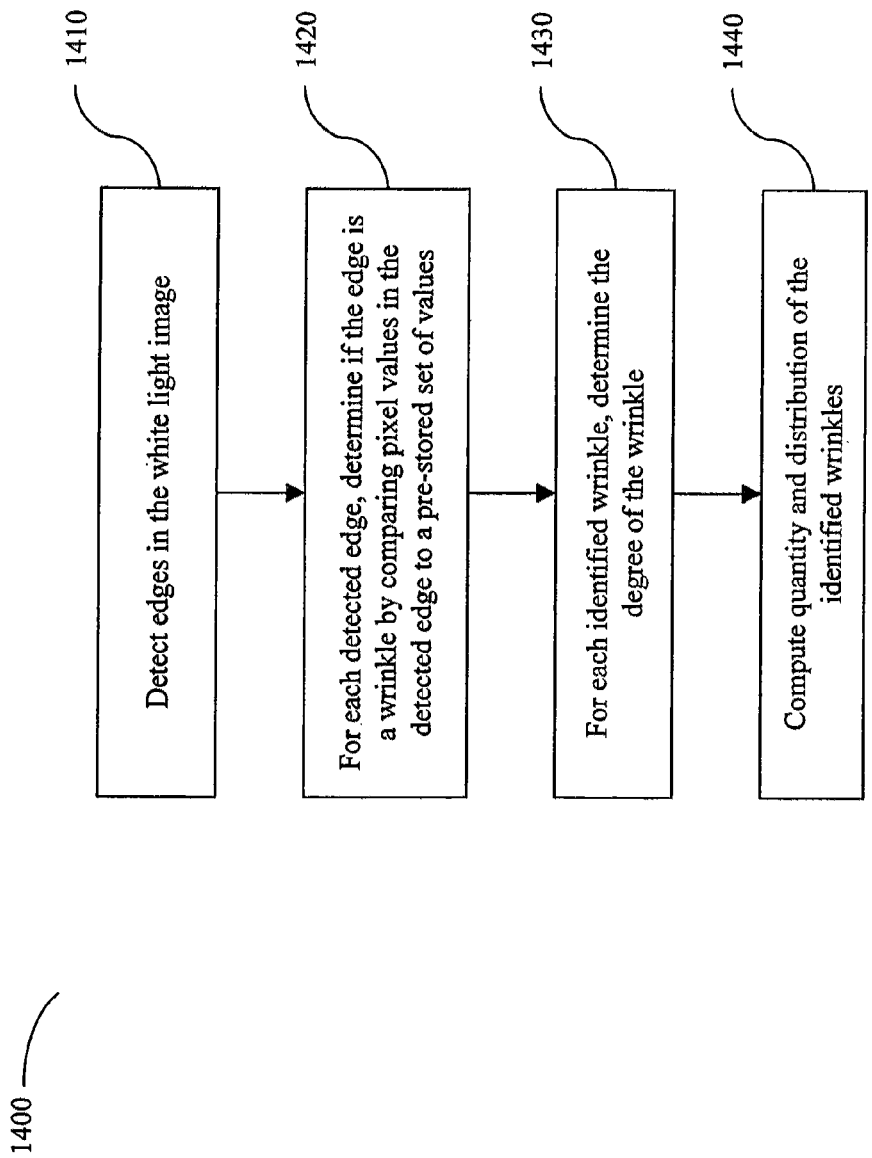
FIG. 14 is a flowchart illustrating process steps for obtaining results related to wrinkles according to one embodiment of the present invention.

In one exemplary embodiment of the present invention, sub-modules 1024 further include sub-module 1400 for evaluating wrinkles on subject 101, as shown in FIG. 14. Sub-module 1400 includes step 1410 in which a conventional or proprietary edge detector, such as the publicly available Canny edge detector, is used to detect edges in any of the white-light image after the non-skin pixels are extracted from the white-light image, and step 1420 in which each detected edge is examined to determine if it is a wrinkle.

In one exemplary embodiment, an edge is determined to be a wrinkle if a predetermined percentage of corresponding pixels have pixel values that satisfy predetermined criteria. The predetermined criteria may be derived from pre-stored or recently computed skin color values for subject 101. For example, average values for the read, green, and blue color channels for subject 101 can be used to set the criteria, and if a predetermined percentage, such as over 70% of the pixels corresponding to the edge have their red, green, and blue channel values roughly proportional to the average red, green blue channel values, the edge would be determined as a wrinkle.

Sub-module 1400 may further include step 1430 in which the pixels around the edges are examined to determine the degree of the wrinkle. For example, for a fine line wrinkle, the pixels corresponding to the edge indicating the likely presence of the wrinkle should have intensity values substantially less than those of the surrounding pixels, and for a deep wrinkle, a wider edge should be expected, and there should be a wider line of pixels having depressed intensity values.

Sub-module 1400 may further include step 1440 in which the number of all wrinkles or wrinkles of a certain degree is counted, and a distribution of the wrinkles across the subject may also be computed.

Some or all of the above exemplary results, such as those related to UV damage, skin tone, pores, and wrinkles, and any other skin condition results that can be derived from the white-light and UV image, can be used as the skin condition results in identifying subject 101 in modules 660 and 680 in method 600 discussed above with reference to FIG. 6A. In module 660, the skin condition results are compared with respective skin condition results stored in database 256, and in module 680 a decision is made as to whether the person is the right person, i.e., identified, or wrong person, i.e., not identified, based on the comparison.

Figure 15:
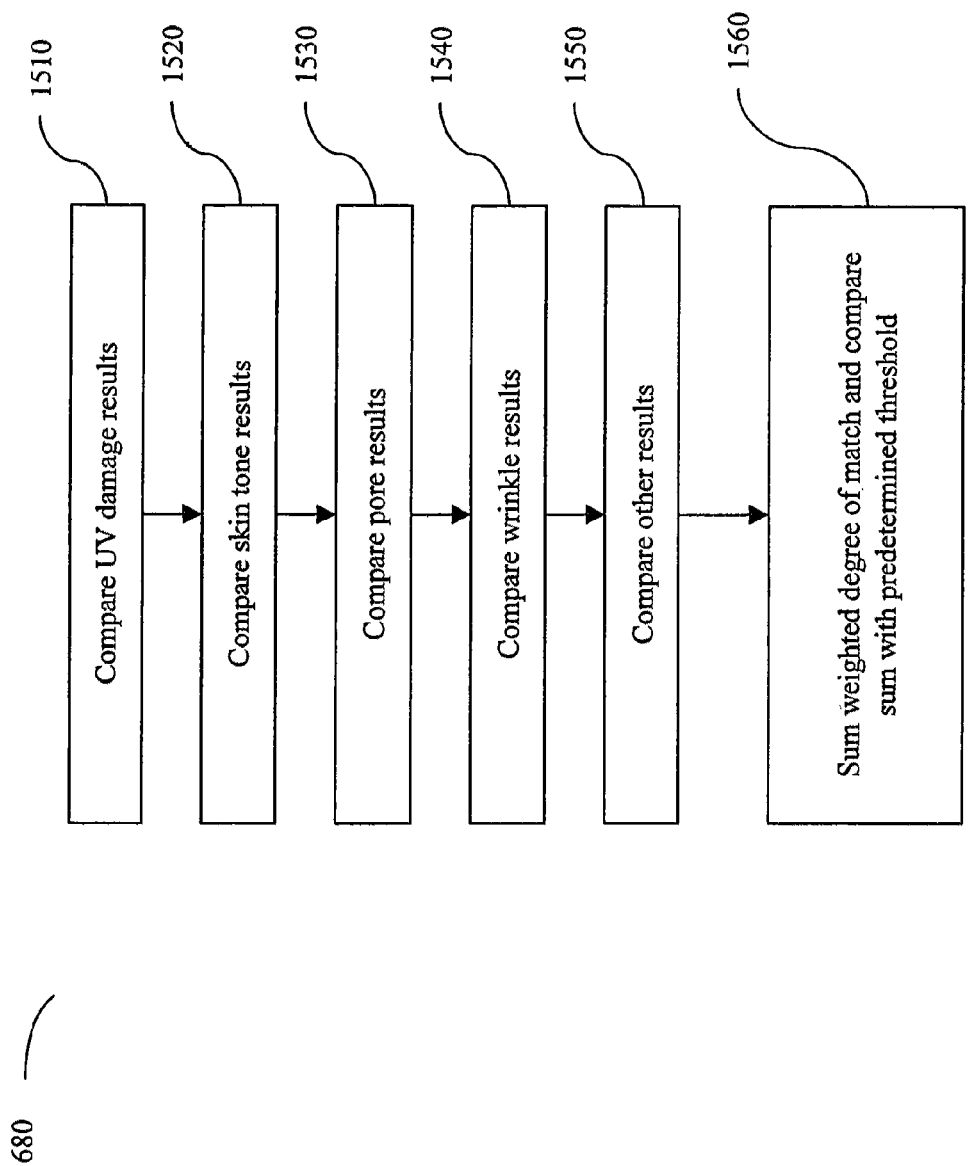
FIG. 15 is a flowchart illustrating process steps for determining whether a math occurred according to step 680 of the flowchart of FIG. 6.

In one exemplary embodiment, module 680 makes the decision using some or all of the process steps illustrated in FIG. 15. As shown in FIG. 15, module 680 may include step 1510 in which the average green channel value, the first standard deviation value, and the second standard deviation value computed in steps 1120, 1130, and 1140, respectively, are compared with a pre-stored average green channel value, first standard deviation value, and second deviation value, respectively, associated with a known person. A degree of match, which may come in the form of a number, percentage, and/or weight, is given based on a difference measure for each result. The difference measure for a skin condition result may be defined, for example, by:

$$\text{Difference\_Measure} = \sqrt{\left[2 \times \frac{(Result_{obtained} - Data_{prestored})}{(Result_{obtained} + Data_{prestored})}\right]^2}$$

where, for example, $Result_{obtained}$ may be one of the average green channel values, the first standard deviation value, and the second standard deviation value computed in steps 1120, 1130, and 1140, and $Data_{prestored}$ may be a respective one of the pre-stored average green channel values, first standard deviation value, and second deviation value associated with the known person. The difference measure can be converted to a degree of match. For example, a degree of match of 80%, may be given if a difference measure equals to 0.2.

Module 680 may further include step 1520 in which skin tone results are compared with pre-stored skin tone results of the known person, and a degree of match is obtained for each of the skin tone results, similar to those described above.

Module 680 may further include step 1530 in which the results associated with localized skin conditions detected using the UV image, such as pores, pigmentation, moles, etc., are compared with pre-stored pore results of the known person, and a degree of match is obtained for each of the results, similar to those described above. For the results associated with localized skin conditions, in addition to a total count of the number of affected areas for each type of skin condition, the locations and sizes of each affected area are also compared with respective pre-stored results.

For example, if an affected area, such as a mole or pigmentation is found at a certain location from processing the UV image, database 526 is searched for an affected area near the same location, and if the type of skin condition associated with the affected area is also that of a mole or pigmentation, the size and location, such as a center location, of the affected area in database 526 is compared with the size and location of the mole or pigmentation to obtain a degree of match for each of them. Otherwise, if the type of skin condition associated with the affected area is not a mole or pigmentation, a zero degree of match for either the size or location of the mole or pigmentation is returned.

Module 680 may further include step 1540 in which the wrinkle results are compared with pre-stored wrinkle results of the known person, and a degree of match is obtained for each of the wrinkle results, similar to those described above.

Module 680 may further include step 1550 in which the other skin condition results such as skin oil, hydration level, etc., are compared with respective pre-stored results of the known person, and a degree of match is obtained for each of the other skin condition results, similar to those described above.

In addition, module 680 includes step 1560 in which each degree of match obtained above is weighted appropriately and all of the degree of match values are summed to obtain a match sum. The match sum is compared with a pre-determined threshold to determine if the person to be identified is the known person. The weight for each degree of match is chosen to reflect the importance and reliability of the respective skin condition in identifying the person.

For example, a degree of match associated with a wrinkle result may be weighted less that that associated with a pore result, because the wrinkle result is determined mainly by using the white-light image and thus more subject to manipulation by someone attempting to bypass the auto-identification system.

Figure 16:
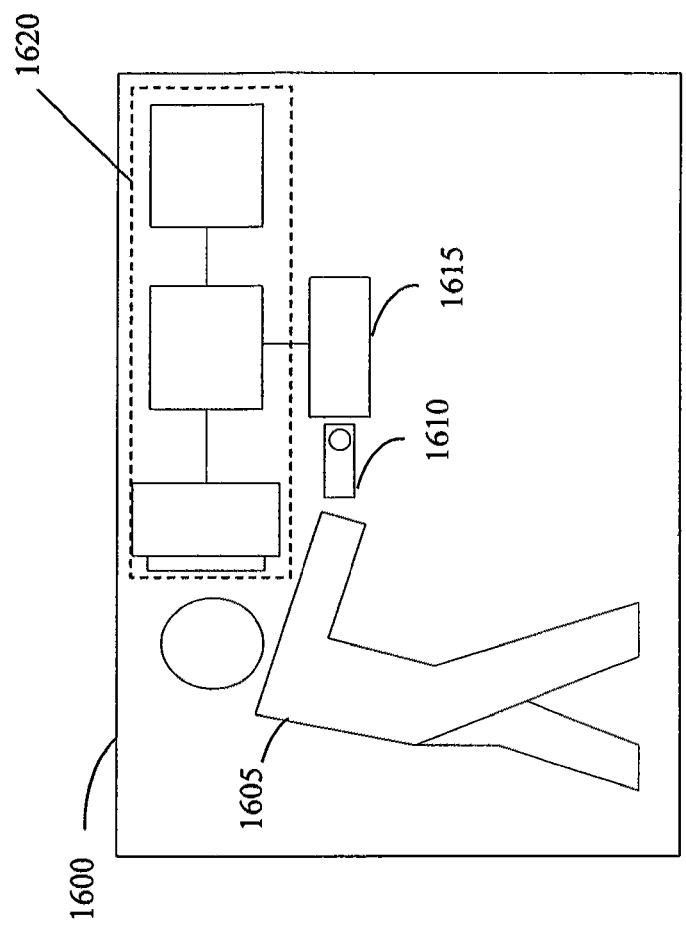
FIG. 16 is a line drawing illustrating the identification of a person in an identification card using the systems and methods of the present invention.

Referring now to FIG. 16, a line drawing illustrating the identification of a person in an identification card using the systems and methods of the present invention is described. FIG. 16 shows a system 1600 that may be used at a number of locations, including security checkpoints at airports or inside cars, airplanes or at any other location suitable for identifying a person. System 1600 may be used to match an image of a person on a identification card with an image of the person acquired immediately on site.

Person 1605 with identification card 1610 places identification card 1610 on image reader 1615. Image reader 1615 reads and stores the image of person 1605 in identification card 1610 in identification system 1620, designed in accordance with the present invention. Identification system 1620 includes an image acquisition device for acquiring an image of person 1605 and modules for comparing the acquired image of person 1605 with the image from identification card 1610 to determine whether person 1605 is the right person, i.e., to determine whether person 1605 is the person in identification card 1610.

The foregoing descriptions of specific embodiments and best mode of the present invention have been presented for purposes of illustration and description only. They are not intended to be exhaustive or to limit the invention to the precise forms disclosed. Specific features of the invention are shown in some drawings and not in others, for purposes of convenience only, and any feature may be combined with other features in accordance with the invention. Steps of the described processes may be reordered or combined, and other steps may be included. The embodiments were chosen and described in order to best explain the principles of the invention and its practical application, to thereby enable others skilled in the art to best utilize the invention and various embodiments with various modifications as are suited to the particular use contemplated. Further variations of the invention will be apparent to one skilled in the art in light of this disclosure and such variations are intended to fall within the scope of the appended claims and their equivalents. The publications referenced above are incorporated herein by reference in their entireties.

What is claimed is:

1. A method for automatically identifying a person, comprising:
    applying white-light radiation to at least a portion of a body surface and acquiring a first white-light image at a portable image acquisition device;
    applying UV radiation to said portion of said body surface and acquiring a first UV image at said portable image acquisition device;
    generating a skin mask from the first white-light image and the first UV image;
    comparing the skin mask with a pre-stored skin mask for a known person to determine whether the two skin masks substantially match, and if there is a substantial match;
    obtaining results related to at least one skin condition from at least the first UV image; and
    comparing the results with pre-stored data associated with the at least one skin condition for the known person to determine if the person to be identified is the known person.

2. The method of claim 1, wherein the portable image acquisition device is selected from the group consisting of: a film-based camera; a digital camera; a wireless phone; a personal digital appliance; a desktop computer; a notebook computer; a digital music player; a set-top box; a video game unit; and an entertainment unit.

3. The method of claim 1, further comprising sending the first white-light image and the UV image to a computing device for identification.

4. The method of claim 1, wherein the skin mask comprises a plurality of elements corresponding to a pixel in the at least one white-light image or the UV image.

5. The method of claim 4, further comprising identifying skin pixels and non-skin pixels in the skin mask.

6. The method of claim 5, wherein identifying skin pixels comprises determining if a pixel in the skin mask is a skin pixel by examining properties of the pixel with reference to criteria for skin pixels associated with at least one color space.

7. The method of claim 6, further comprising extracting pixels corresponding to non-skin features from the UV image before obtaining the results.

8. The method of claim 7, wherein identifying skin pixels comprises identifying a pixel in the first white-light image and the UV image that corresponds to an element having a first value in the skin mask as a skin pixel.

9. The method of claim 6, wherein generating the skin mask comprises, for an element in the skin-mask:
    examining the corresponding pixel in the first white-light image to determine if values in the corresponding pixel in the first white-light image satisfy predetermined criteria for skin pixels;
    assigning a first value to the element in the skin mask if the corresponding pixel in the first white-light image satisfy the criteria; and
    assigning a second value to the element in the skin mask if the corresponding pixel in the first white-light image does not satisfy the criteria.

10. The method of claim 9, wherein the first white-light image is of a first color space and the step of generating comprises:
    converting the first white-light image into at least one second white-light image of at least one second color space; and
    for an element in the skin-mask,
        determining if the corresponding pixel in the first and at least one second white-light images is a skin pixel or a non-skin pixel;
        assigning a first value to the element if the corresponding pixel in the first and at least one second white-light images is determined to be a skin pixel; and
        assigning a second value to the element if the corresponding pixel in any of the white-light images is determined to be a non-skin-pixel.

11. The method of claim 10, wherein the step of determining comprises:
    determining if values in the corresponding pixels in the first white-light image satisfy predetermined criteria for skin pixels associated with the first color space; and
    determining if values in a corresponding pixel in the at least one second white-light images satisfy criteria for skin pixels associated with a respective one of the at least one second color space.

12. The method of claim 10, wherein some of the elements in the skin mask have coordinates that are predefined as coordinates associated with non-skin features.

13. The method of claim 12, wherein the step of assigning the first value comprises assigning the first value to the pixel in the skin-mask image if the corresponding pixel in the white-light images is determined to be a skin pixel and coordinates of the pixel in the skin-mask are not predefined to be coordinates associated with a non-skin feature.

14. The method of claim 13, wherein the at least one skin condition is selected from a group consisting of: skin tone; UV damage; pores; wrinkles; hydration levels; collagen content; skin type; topical inflammation; ablation; keratosis; deep inflammation; sun spots; pigmentation; moles; scars; acne; fungi; and erythema.

15. The method of claim 13, wherein the step of obtaining comprises measuring features in the person to quantify their size and volume.

16. The method of claim 15, wherein the step of obtaining comprises using information in the skin pixels of one or both of the first white-light and UV images to obtain UV damage results that locate and quantify UV damage associated with the person.

17. The method of claim 16, wherein the information in skin pixels of the white-light and UV images includes values associated with three color channels, and the UV damage results are computed based on values associated with one of the three color channels in the skin pixels of the UV image.

18. The method of claim 15, wherein a skin pixel of the first white-light image includes values associated with three color channels, and the step of obtaining comprises using values associated with all of the three channels in the skin pixels of the first white-light image to obtain results for skin tone that indicates an evenness of skin-tone associated with the person.

19. The method of claim 18, wherein the step of obtaining further comprises computing a standard deviation for each of the three color channels from values associated with a respective one of the three color channels.

20. The method of claim 15, wherein the step of obtaining comprises:
    computing a color value and an intensity value associated with a skin pixel in the first UV image; and
    determining if the color and intensity values fall within predetermined ranges for at least one skin condition.

21. The method of claim 20, wherein the step of obtaining further comprises, for a skin pixel in the UV image that has color and intensity values falling within predetermined ranges for a specified skin condition, determining a size of a skin area adjacent the skin pixel and having the specified skin condition by examining surrounding skin pixels for the specified skin condition.

22. The method of claim 21, wherein the specified skin condition is related to a specific type of pores, and the step of obtaining further comprises counting skin areas having the specified skin condition to obtain a number of the specific type of pores.

23. The method of claim 22, wherein the at least one skin condition includes a plurality of types of pores, and the step of obtaining further comprises, for a skin pixel in the UV image that has color and intensity values falling within predetermined ranges for each of the plurality of types of pores,
    determining a size of a pore by examining surrounding skin pixels to determine if they belong to a same pore; and
    counting the pores to obtain a pore count.

24. A non-transitory computer readable medium storing therein program instructions that when executed by a processor cause the processor to perform a method for automatically identifying a person, the program instructions comprising: instructions for acquiring a first white-light image by applying white light radiation to a portion of the body surface and for acquiring a first UV image by applying UV radiation to the body surface at a portable image acquisition device, the first white-light and UV images including a plurality of pixels, the pixels in the UV image corresponding to respective pixels in the first white-light image; instructions for generating a skin mask from said first white-light and UV images; instructions for comparing the skin mask with a pre-stored skin mask for the known person; and instructions for identifying skin pixels in at least the UV image related to at least one skin condition from a UV image of at least a portion of a body surface of the person; instructions for comparing the results with pre-stored data associated with the at least one skin condition for a known person to determine if the person to be identified is the known person.

25. The computer readable medium of claim 24, further comprising:
    instructions for extracting pixels corresponding to non-skin features from the UV image before obtaining the results.

26. The computer readable medium of claim 24, wherein the instructions for identifying comprise instructions for determining, for a pixel in the first white-light image, if the pixel is a skin pixel by examining properties of the pixel with reference to criteria for skin pixels associated with at least one color space.

27. The computer readable medium of claim 24, wherein the instructions for identifying comprise identifying a pixel in the first white-light and UV images that corresponds to an element having a first value in the skin mask as a skin pixel.

28. The computer readable medium of claim 24, further comprising instructions for comparing the results with previous results associated with the at least one skin condition of a known person, the previous results generated from an image of the person in an identification card, to determine if the person to be identified is the known person.

29. A computer system including the computer readable medium of claim 24.

30. A system for automatically identifying a person, comprising:
    a portable image acquisition device (a) configured to apply white light radiation to at least a portion of a body surface of the person and to acquire a white-light image and (b) configured to apply UV radiation to said portion of said body surface and to acquire a UV image of said body surface of the person, the white-light and UV images having a plurality of pixels, the pixels in the UV image corresponding to respective pixels in the white-light image;
    a computer system coupled to the portable image acquisition device and configured to identify, on a pixel by pixel basis, skin pixels in the white-light and UV images to generate a skin mask
    a database storing skin mask data associated with a known person;
    a database storing skin condition data associated with a known person;
        wherein the computer system is further configured to compare the skin mask to the stored skin mask data of said known person to determine whether the two skin masks substantially match and if there is a substantial match comparing the skin condition data of said skin mask with the stored skin condition data of said known person to determine if the person to be identified is the known person.

31. The system of claim 30, wherein the image acquisition device has a sensor that can be rotated to adjust an aspect ratio of the white-light or UV image according to control signals from the computer system.

32. The system of claim 31, wherein the image acquisition device comprises:
    an optical assembly configured to form images of the person on the sensor; and
    a plurality of flash light sources attached thereto, including two flash light sources on two sides of the optical assembly, and one on top of the optical assembly, at least a portion of the flash light sources having UV transmission filters installed thereon, and at least a portion of the flash light sources having infrared absorption filters installed thereon.

33. The system of claim 30, wherein the computer system is connected to the image acquisition device via a network.

34. The system of claim 33 wherein the computer system is connected to the image acquisition device via a wireless network.

35. The system of claim 30 wherein said at least one skin condition is selected from a group consisting of: skin tone;

UV damage; pores; wrinkles; hydration levels; collagen content; skin type; topical inflammation; ablation; keratosis; deep inflammation; sun spots; pigmentation; moles; scars; acne; fungi; and erythema.

36. The system of claim 30 wherein said body surface is the face of said person.

37. The method of claim 1 further comprising sending said first white light image and said first UV image to a computing device.

38. The method of claim 37 wherein said sending is via a network.

39. The method of claim 37 wherein said sending is via a wireless network.

40. The method of claim 1 wherein said body surface is the face of said person.

41. The computer readable memory of claim 24 wherein said body surface is the face of said person.

42. The system of claim 30 wherein said skin mask data associated with a known person and said skin condition data associated with a known person are stored on the same database.

43. The system of claim 30 further comprising sending the results said determining to a user of the portable image acquisition device.

44. The computer readable medium of claim 24 further comprising instructions for forwarding the results to a user of the portable image acquisition device.

* * * * *